(12) United States Patent
Park et al.

(10) Patent No.: US 9,013,474 B2
(45) Date of Patent: Apr. 21, 2015

(54) MOBILE TERMINAL AND CONTROLLING METHOD THEREOF

(75) Inventors: Joonkyu Park, Seoul (KR); Seungsik Koh, Seoul (KR); Jeongseok Choi, Seoul (KR); Kiwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 13/418,022

(22) Filed: Mar. 12, 2012

(65) Prior Publication Data

US 2013/0090101 A1    Apr. 11, 2013

(30) Foreign Application Priority Data

Oct. 10, 2011  (KR) .......................... 10-2011-0103140

(51) Int. Cl.
| | |
|---|---|
| G06T 15/00 | (2011.01) |
| G06F 3/147 | (2006.01) |
| G06F 17/30 | (2006.01) |
| G09G 3/00 | (2006.01) |
| H04N 13/00 | (2006.01) |
| G06F 3/0488 | (2013.01) |
| G06F 3/14 | (2006.01) |
| G09G 5/14 | (2006.01) |

(52) U.S. Cl.
CPC .............. *G06F 3/147* (2013.01); *G06F 3/1454* (2013.01); *G06F 17/30905* (2013.01); *G09G 3/003* (2013.01); *G09G 5/14* (2013.01); *H04N 13/0059* (2013.01); *G09G 2320/0606* (2013.01); *G09G 2320/08* (2013.01); *G09G 2330/021* (2013.01); *G09G 2340/14* (2013.01); *G09G 2350/00* (2013.01); *G09G 2370/027* (2013.01); *G06F 3/0488* (2013.01)

(58) Field of Classification Search
CPC ....................................................... H04N 13/00
USPC ........... 345/419; 348/51; 455/414.3; 715/234
See application file for complete search history.

(56) References Cited

U.S. PATENT DOCUMENTS

| | | |
|---|---|---|
| 2011/0050687 A1 | 3/2011 | Alyshev et al. |
| 2011/0161843 A1 | 6/2011 | Bennett et al. |

FOREIGN PATENT DOCUMENTS

WO    WO 2011/117068 A1    9/2011

*Primary Examiner* — Maurice L McDowell, Jr.
(74) *Attorney, Agent, or Firm* — Birch, Stewart, Kolasch & Birch, LLP

(57) ABSTRACT

A mobile terminal including a wireless communication unit configured to request a 3D webpage from a web server; a display unit configured to display the 3D webpage received via the wireless communication unit; a memory configured to set a display condition of the 3D webpage for the mobile terminal; and a controller configured to detect whether a current status of the mobile terminal meets the set display condition when a command for accessing the 3D webpage is input before the 3D webpage is requested from the web server, request and receive the 3D webpage via the wireless communication unit if the current status of the mobile terminal meets the set display condition, control the display unit to display the received 3D webpage, and control a 3D operation of the displayed 3D webpage.

30 Claims, 28 Drawing Sheets

FIG. 5
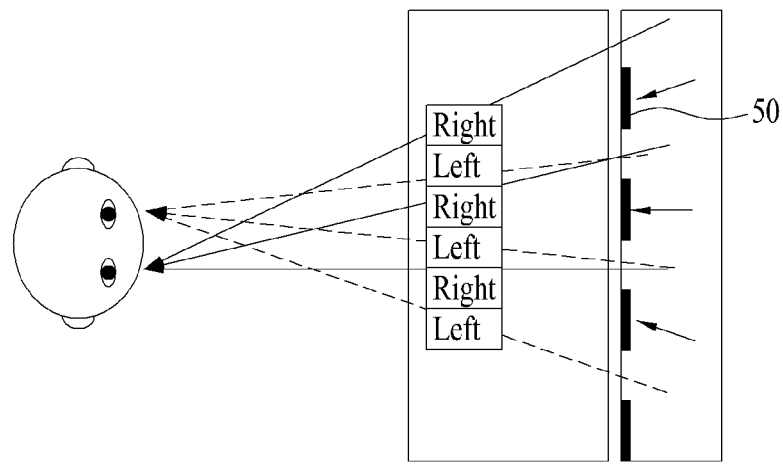
(a)
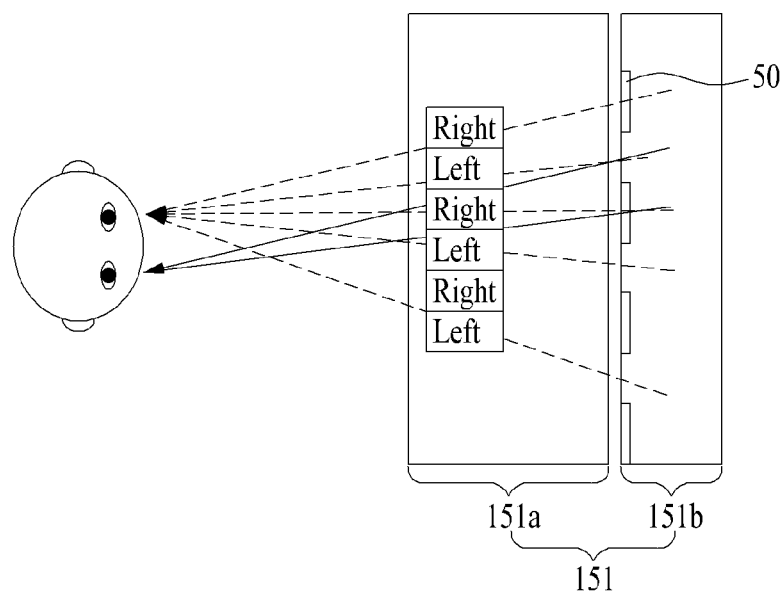
(b)

FIG. 10
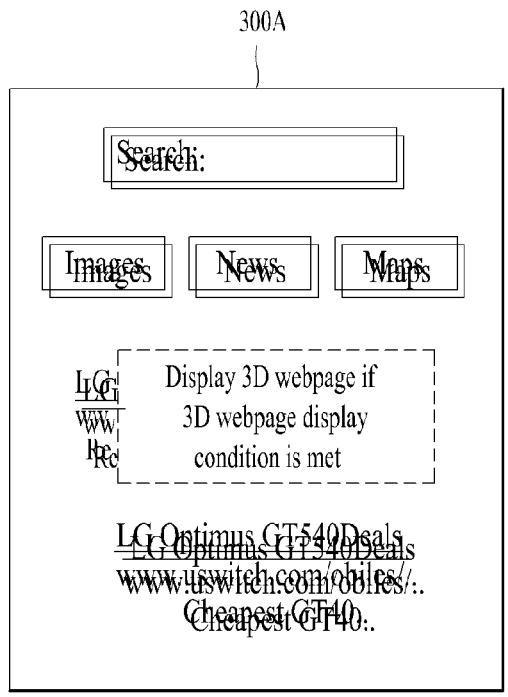
(a)
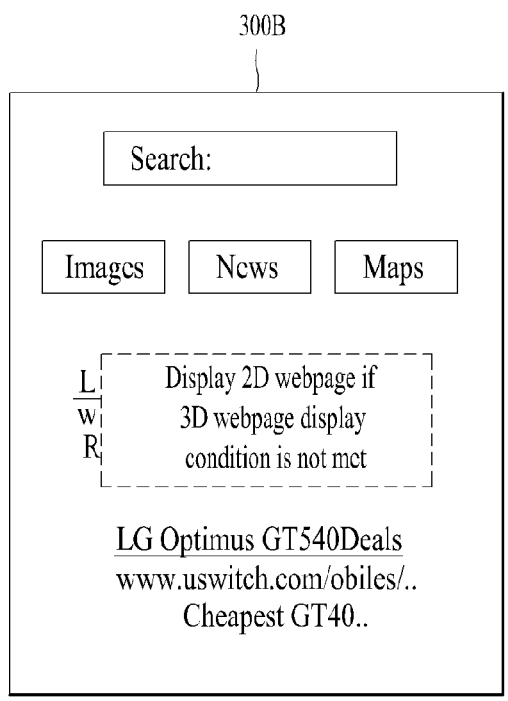
(b)

FIG. 13
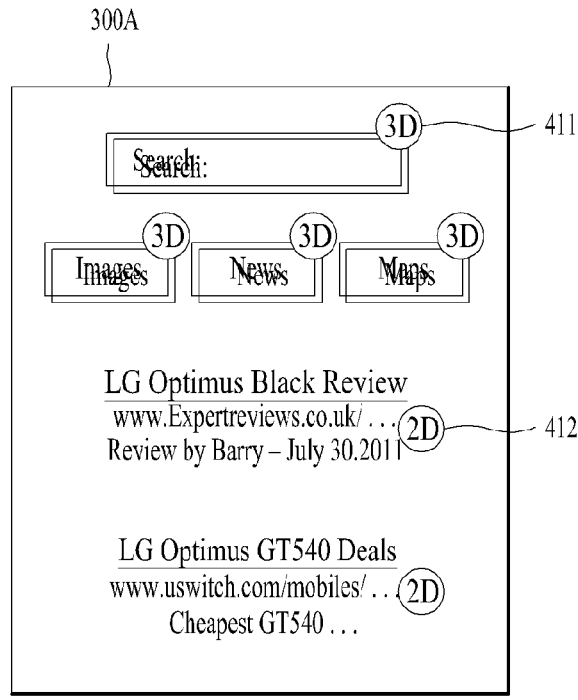
(a)
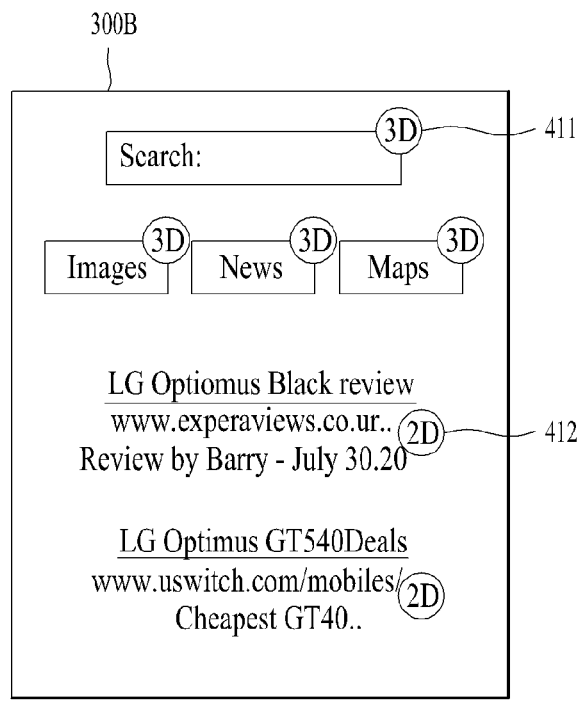
(b)

MOBILE TERMINAL AND CONTROLLING METHOD THEREOF

Pursuant to 35 U.S.C. §119(a), this application claims the benefit of earlier filing date and right of priority to Korean Application No. 10-2011-0103140, filed on Oct. 10, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a user to use a terminal in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As a smart phone having a 3D function has recently been released, a web service providing server provides a user with 3D web service via the smart phone.

However, because the 3D web service needs capacity and power consumption more than those of a related 2D 2eb service, when a communication rate of a smart phone or a battery level is low, if a user uses the smart phone thoughtlessly, it may cause a problem that a power of the smart phone is turned off relatively fast or a problem that the web service is not provided smoothly.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which 3D or 2D webpage can be appropriately provided in consideration of a display condition of the 3D webpage set for the mobile terminal in case of a presence of a 3D webpage display request made by a user.

Another object of the present invention is to provide a mobile terminal and controlling method thereof, by which a user is facilitated to recognize and use contents variously in 3D webpage by controlling 3D operations of the provided 3D webpage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes a wireless communication unit configured to request a 3D webpage to a web server providing the 3D webpage including a plurality of 3D contents, and to receive the 3D webpage from the web server, a display unit configured to display the 3D webpage received via the wireless communication unit, a memory configured to set a display condition of the 3D webpage for the mobile terminal, and a controller configured to detect whether a current status of the mobile terminal meets the set display condition when a command for an access to the 3D webpage is input before the 3D webpage is requested to the web server, to request and receive the 3D webpage via the wireless communication unit if the current status of the mobile terminal meets the set display condition, to control the display unit to display the received 3D webpage, and to control a 3D operation of the displayed 3D webpage.

In another aspect of the present invention, a method of controlling a mobile terminal according to an embodiment of the present invention includes the steps of setting a display condition of a 3D webpage including a plurality of 3D contents, checking whether a current status of the mobile terminal meets the set display condition if a command for an access to the 3D webpage is input, requesting and receiving the 3D webpage from a web server providing the 3D webpage if the display condition is met, displaying the received 3D webpage, and controlling a 3D operation of the displayed 3D webpage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a diagram for a scheme of implementing a 3D stereoscopic image in a display unit of a parallax barrier type applicable to embodiments of the present invention;

FIG. 10 is a diagram of screen configuration of a process for providing a 3D webpage based on a 3D webpage display condition in a mobile terminal according to an embodiment of the present invention;

FIG. 13 is a diagram of screen configuration of a process for controlling a 3D operation of a 3D webpage displayed by the processes shown in FIGS. 6 to 10 according to a $3^{rd}$ embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
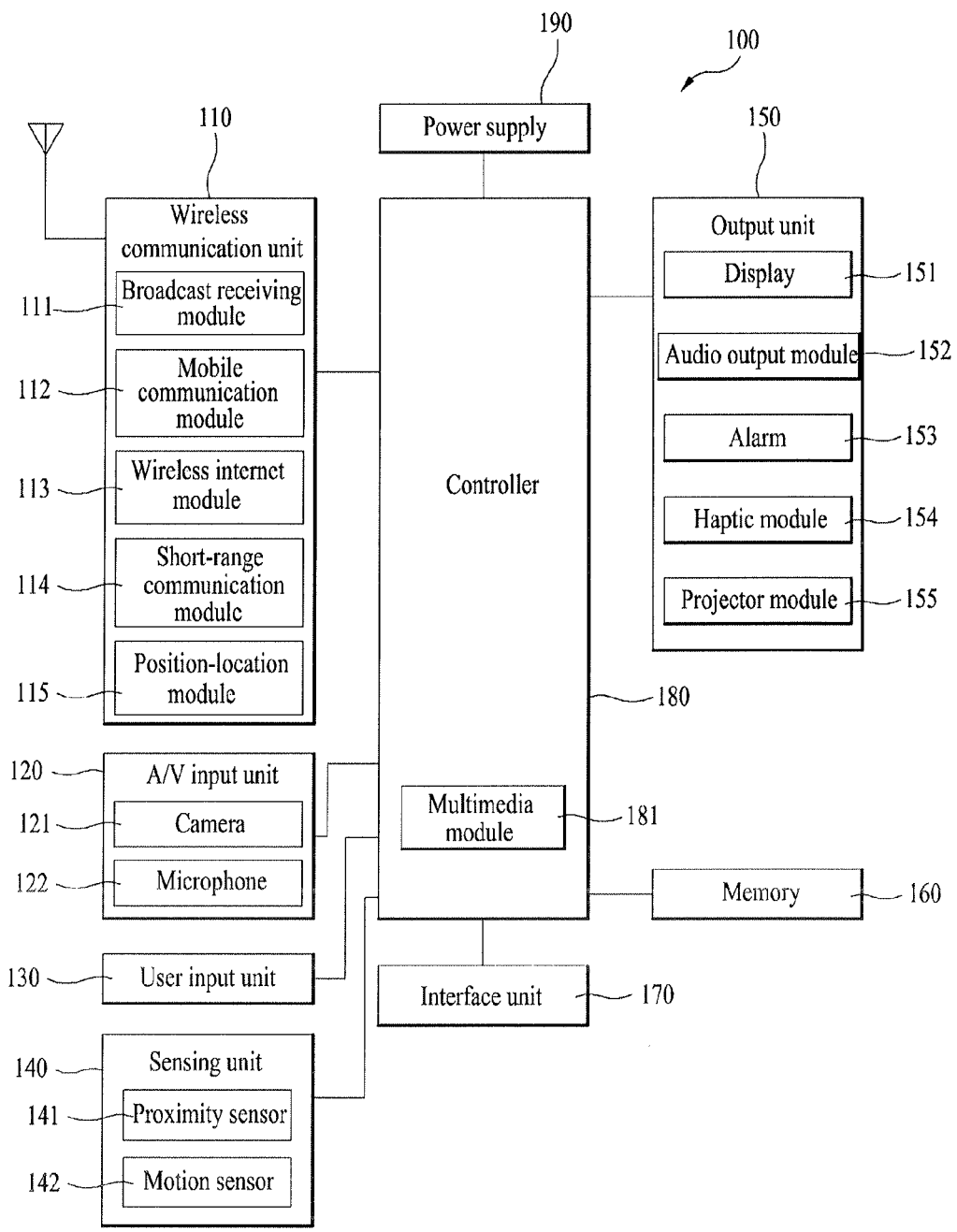
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an AN (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

Moreover, the mobile communication module 112 connects a communication with a 3D web providing server 700, transmits a signal for requesting a 3D webpage selected by a user to the 3D web providing server 700, and receives a signal including the 3D webpage in accordance with the request from the 3D web providing server 700, under the control of the controller 180.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Moreover, as mentioned in the foregoing description, the wireless internet module 113 can receive or download the data relevant to the area, in which the mobile terminal 100 is located, from the external server.

The wireless internet module 113 connects a communication with the 3D web providing server 700, transmits a signal for requesting a 3D webpage selected by a user to the 3D web providing server 700, and receives a signal including the 3D webpage in accordance with the request from the 3D web providing server 700, under the control of the controller 180.

The short-range communication module 114 facilitates relatively-short-range communications. And, the short-range communication module 114 connects a communication with the 3D web providing server 700, transmits a signal for requesting a 3D webpage selected by a user to the 3D web providing server 700, and receives a signal including the 3D webpage in accordance with the request from the 3D web providing server 700, under the control of the controller 180.

Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (AN) input unit 120 is configured to provide audio or video signal input to the mobile terminal 100. As shown, the AN input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

In this instance, at least two cameras 121 can be provided according to user environment.

For instance, the camera 121 can include a first camera 121a and a second camera 121b provided for 3D image photographing to a face opposite to another face on which the display unit 151 of the mobile terminal 100 is loaded. And, a third camera 121c for user's self-photographing can be provided to a prescribed region of the face provided with the display unit 151 of the mobile terminal 100.

In this instance, the first camera 121a is provided for photographing a left eye image as a source image of a 3D image, while the second camera 121b is provided for photographing a right eye image as a source image of the 3D image, for example.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

And, the display unit 151 of the present invention may support 2D display mode and 3D display mode.

In particular, the display unit 151 of the present invention may be configured in a manner of combining a general display device 151a with a switching liquid crystal 151b, as shown in FIG. 5. The display unit 151 can separate light into different lights respectively arriving at right and left eyes by controlling a light propagation direction by activating a parallax barrier 50, as shown in FIG. 5 (a), using the switching liquid crystal 151b. Therefore, when an image having a combination of a right eye image and a left eye image is displayed on the display device 151a, a user can experience a stereoscopic effect by looking at the images respectively corresponding to user's eyes.

In particular, in the 2D display mode, the display unit 151 performs a normal 2D display operation by activating the display device 151a only without activating the switching liquid crystal 151b and the parallax barrier 50, under the control of the controller 180.

In the 3D display mode, the display unit 151 performs a 3D display operation by activating the switching liquid crystal 151b, the parallax barrier 50 and the display device 151a, under the control of the controller 180.

The 3D displaying process performed by the display unit 151 shall be described in detail with reference to FIGS. 3 to 5 later.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor 141 has a durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 performs an image projector function using the mobile terminal 100. And, the projector module 155 can display an image, which is identical to or partially different at least from the image displayed on the display 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. Further, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

According to an embodiment of the present invention, the memory 160 stores a web browser for displaying a 3D or 2D webpage. In this instance, the web browser may be saved by being downloaded from the 3D web providing server 700 via the wireless communication unit 110.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
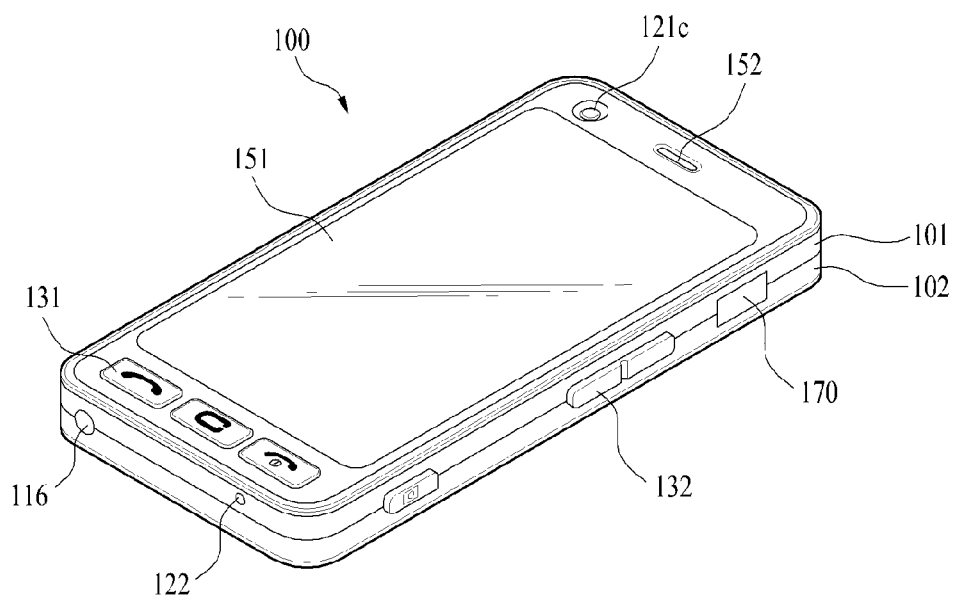
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
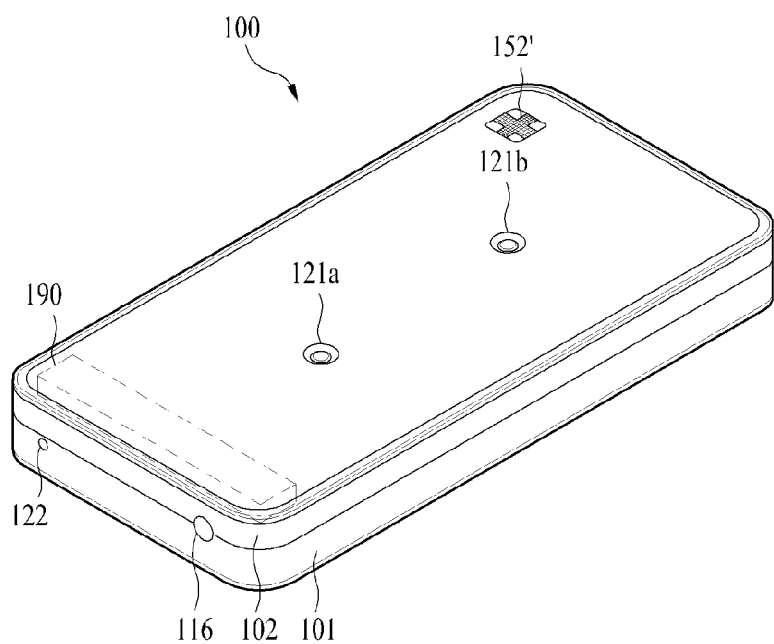
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a first camera 121a and a second camera 121b for 3D image photographing can be additionally provided to a backside of the terminal body, and more particularly, to the rear case 102.

In particular, the first and second cameras 121a and 121b are arranged on the straight line within a range not to exceed user's eye distance (e.g., 6.0~6.5 cm). In addition, a rail enabling the first and second cameras 121a and 121b to move thereon is installed between the first and second cameras 121a and 121b. Thus, the first and second cameras 121a and 121b can move to each other via the rail 183 under the control of a camera moving unit 182.

In this instance, the first and second cameras 121a and 121b enable a normal 2D image photographing as well as the 3D image function. Moreover, a mirror and flash can be further provided around the first and second cameras 121a and 121b.

The flash projects light toward a subject in case of photographing the subject using the first and second cameras 121a and 121b. When a user attempts to take a picture of himself (self-photographing) using the first and second cameras 121a and 121b, the mirror enables the user to view his face reflected by the mirror.

Meanwhile, each of the first and second cameras 121a and 121b has a photographing direction substantially opposing that of the third camera 121c and may have pixels identical to or different from those of the third camera 121c.

Preferably, for instance, the third camera 121c has low pixels enough to photograph and transmit a picture of user's face for a video call and the like, while each of the first and second cameras 121a and 121b has high pixels for photographing a general subject without transmitting the photographed subject instantly.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this instance, if the display 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a method of controlling a 3D image in a mobile terminal applicable to embodiments of the present invention is explained.

Stereoscopic images implemented on the display unit 151 of the mobile terminal 100 according to an embodiment of the present invention can be mainly classified into two kinds of categories. In this instance, the reference of this classification relates to whether different images are provided to both eyes, respectively. The first stereoscopic image category is described as follows, First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image (2D image).

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain can sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category.

The binocular disparity is explained in detail with reference to FIG. 3 as follows.

Figure 3:
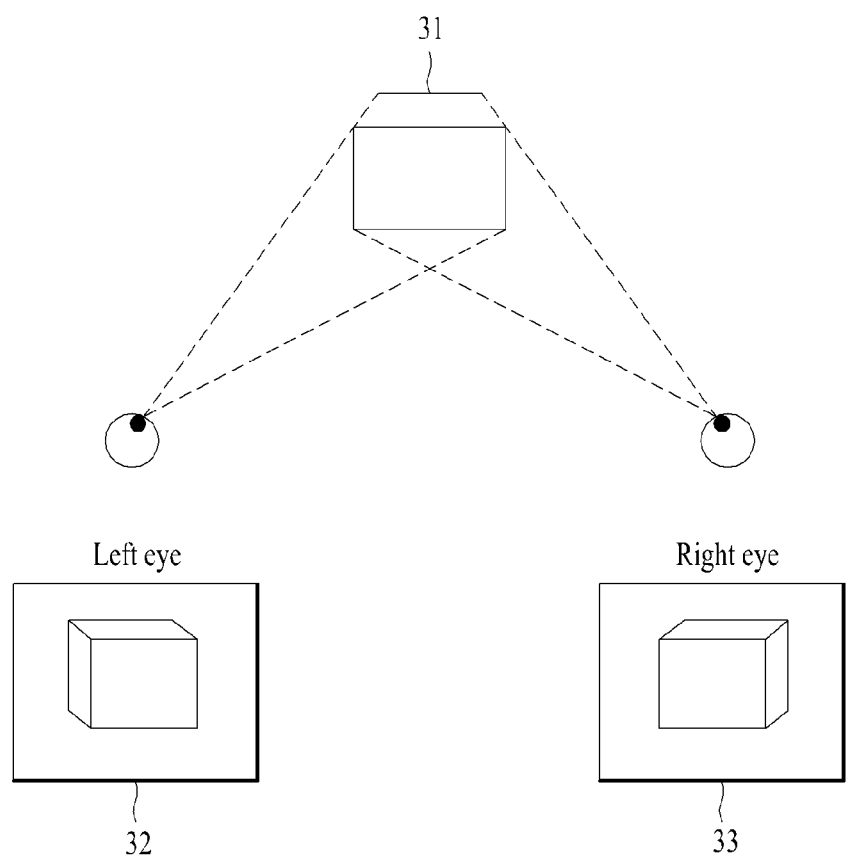
FIG. 3 is a diagram for explaining the principle of binocular disparity.

FIG. 3 is a diagram for explaining the principle of binocular disparity. Referring to FIG. 3, assume a situation that a hexahedron 31 is positioned as a subject in front below an eye's height to be seen through human eyes. In this instance, a left eye can see a left eye planar image 32 revealing three facets including a top side, a front side and a left lateral side of the hexahedron 31 only. In addition, a right eye can see a right eye planar image 33 revealing three facets including the top side, the front side and a right lateral side of the hexahedron 31 only.

Even if a real thing is not actually positioned in front of both eyes of a user, if the left eye planar image 32 and the right eye planar image 33 are set to arrive at the left eye and the right eye, respectively, a user can substantially sense the hexahedron 31 as if looking at the hexahedron 31 actually.

Thus, in order to implement the 3D image belonging to the second category in the mobile terminal 100, images of the same object should arrive at both eyes by discriminated from each other for the left and right eye images of the same object with a predetermined parallax.

In the following description, 3D depth attributed to the binocular disparity (parallax) is explained with reference to FIG. 4.

Figure 4:
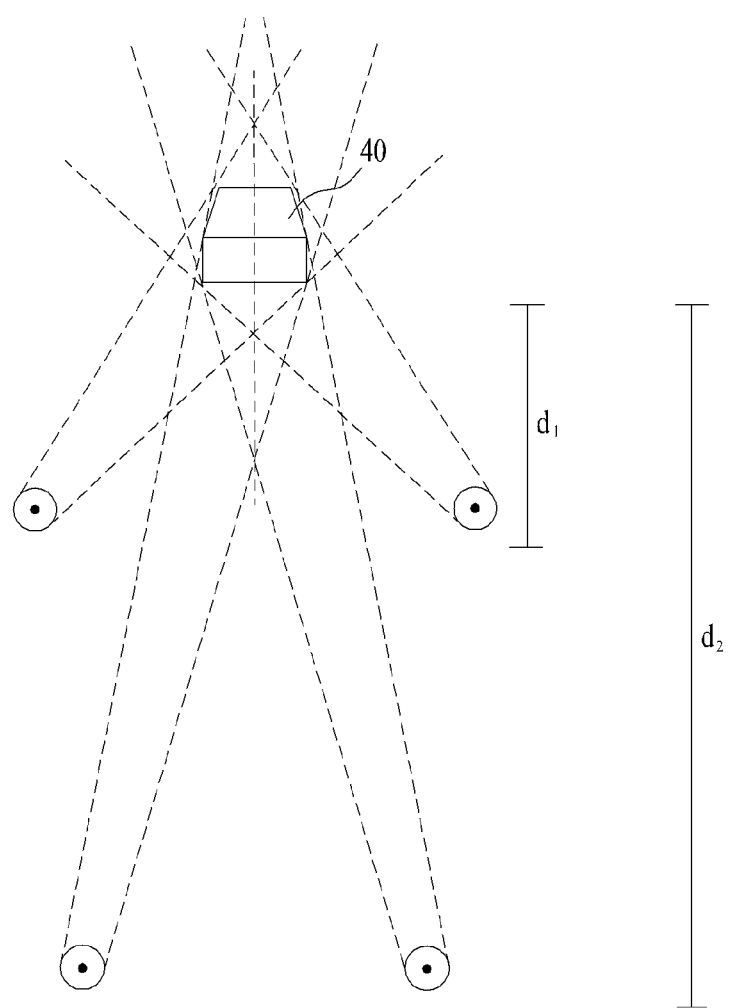
FIG. 4 is a diagram for concept of a sense of distance and 3D depth attributed to binocular disparity.

FIG. 4 is a diagram for concept of a sense of distance and 3D depth. Referring to FIG. 4, a lateral side ratio of an image entering each eyeball in view of a hexahedron 40 in a distance d1 trough both eyes is relatively higher than that in a distance d2, whereby a difference between images seen through both eyes increases. Moreover, an extent of a stereoscopic effect sensed by a user in view of the hexahedron 40 in the distance d1 can become higher than that in view of the hexahedron 40 in the distance d2. In particular, when a thing is seen through both eyes of a user, a closer subject gives a greater stereoscopic effect, whereas a farther subject gives a smaller stereoscopic effect. Such a difference in stereoscopic effect can be digitized into a 3D depth or a 3D level.

A method of implementing a 3D stereoscopic image is described as follows. As mentioned in the following description, in order to implement a 3D stereoscopic image, an image for a right eye and an image for a left eye need to arrive at both eyes by discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 4 as follows.

FIG. 5 is a diagram for a scheme of implementing a 3D stereoscopic image in a display unit of a parallax barrier type applicable to embodiments of the present invention.

Referring to FIG. 5, a structure of a parallax barrier type display unit 151 for displaying a 3D image can be configured in a manner that a general display device 151*a* is combined with a switch LC (liquid crystals) 151*b*. A propagating direction of light is controlled by activating an optical parallax barrier 600, as shown in FIG. 5(*a*), using the switch LC 151*b*, whereby the light is separated into two different lights to arrive at left and right eyes, respectively. Thus, when an image generated from combining an image for the right eye and an image for the left eye together is displayed on the display device 151*a*, a user sees the images corresponding to the eyes, respectively, thereby feeling the 3D or stereoscopic effect.

Alternatively, referring to FIG. 5(*b*), the parallax barrier 600 attributed to the switch LC is electrically controlled to enable entire light to be transmitted therethrough, whereby the light separation due to the parallax barrier is avoided. Therefore, the same image can be seen through left and right eyes. In this instance, the same function of a conventional display unit is available.

In particular, FIG. 5 shows that the parallax barrier performs parallel translation in one axial direction, by which the present invention is non-limited. Alternatively, the present invention can use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, assume that a mobile terminal according to one embodiment of the present invention can provide a user with a 3D stereoscopic image via the display unit 151 by one of the above described methods.

Since the 3D image principle described with reference to FIGS. 4 and 5 assumes a stereoscopic object, the object in a left eye image differs from the object in a right eye image in shape.

Yet, if an object is not a stereoscopic object but a planar object, a shape of the object in a left eye image is identical to that of the object in a right eye image. If a position of the object in the left eye image is different from that of the object in the right eye image, a user can view the corresponding object in the perspective. To help the understanding of this disclosure, assume that a stereoscopic image in the following description is a planar object. Of course, it is apparent to those skilled in the art that the present invention is applicable to a stereoscopic object as well.

In the following description, a process for providing a 3D webpage in a mobile terminal according to an embodiment of the present invention is explained in detail with reference to FIGS. 6 to 28.

Figure 6:
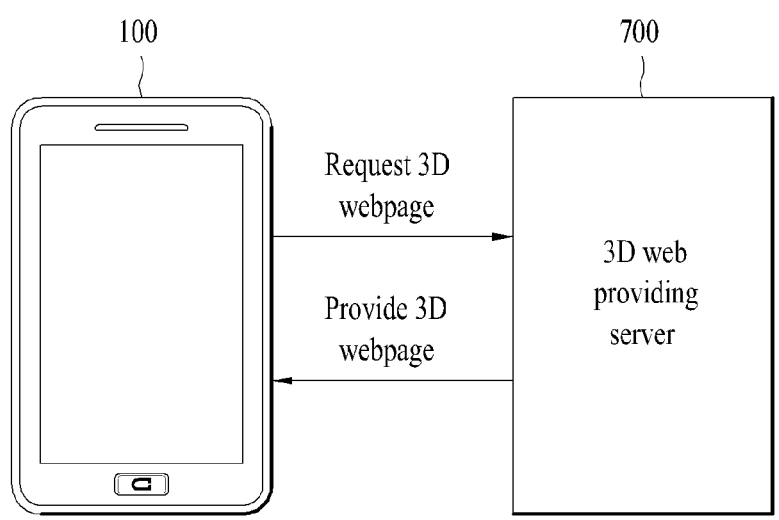
FIG. 6 is a diagram of a 3D web service providing system including a mobile terminal and a 3D web providing server according to an embodiment of the present invention.

FIG. 6 is a diagram of a 3D web service providing system including a mobile terminal and a 3D web providing server according to an embodiment of the present invention. Referring to FIG. 6, a 3D web service providing system according to an embodiment of the present invention may include a mobile terminal 100 and a 3D web providing server 700.

The 3D web providing server 700 transmits a 3D webpage, which includes a plurality of contents, to the mobile terminal 100 in response to a request made by the mobile terminal 100. In particular, a plurality of contents may include at least one or more 3D contents.

In this instance, the 3D webpage may include a webpage of a portal site that provides various information searches, an email service, a blog service, a café service and various kinds of multimedia, an email dedicated webpage or an SNS messenger dedicated webpage. In particular, the 3D webpage may include every webpage that provides a web service of a 3D type.

The contents included in the 3D webpage may include all displayable objects, which are provided by a web, such as text, image, video, hyperlink, URL, icon, email, SNS message, comment and the like.

If a display command for a specific 3D webpage is input by a user, the mobile terminal 100 checks whether a current status of the mobile terminal 100 meets a preset display condition of a 3D webpage before accessing the 3D webpage corresponding to the display command via the wireless communication unit 110.

In this instance, the display condition of the 3D webpage may include at least one condition set by a user or at least one condition set to default in the mobile terminal 100. In particular, if the display condition is set by a user, the display condition of the 3D webpage may include a presence or non-presence of a 3D webpage use, a remaining battery level, a download speed, a temporary storage capacity, a web supplier recommendation, a landscape/portrait mode.

If the display condition is set to a default, the display condition of the 3D webpage may correspond to whether an operation of the mobile terminal 100 supports a 3D function. In particular, if the option of the mobile terminal 100 does not support the 3D function, the status of the mobile terminal 100 may not meet the display condition of the 3D webpage.

A procedure for a user to set a display condition of the 3D webpage shall be described in detail with reference to FIGS. 7 and 8 later.

If the current status of the mobile terminal 100 meets the preset display condition of the 3D webpage, the mobile terminal 100 transmits a signal for requesting a reception of the 3D webpage corresponding to the display command to the 3D web providing server 700, receives the 3D webpage corresponding to the display command from the 3D web providing server 700, and then displays the received 3D webpage.

In doing so, the 3D web providing server 700 transmits right and left eye images for the 3D creation of the 3D webpage to the mobile terminal 100. Using the right and left eye images, the mobile terminal 100 can then create and display the 3D webpage.

In particular, the mobile terminal 100 can create the 3D webpage with reference to 3D depth value previously defined for the right and left eye images. Alternatively, the mobile terminal 100 can create the 3D webpage by applying a 3D depth value set by a user or a preset 3D depth value to the right and left eye images.

On the contrary, if the current status of the mobile terminal 100 does not meet the preset display condition of the 3D webpage, the mobile terminal 100 makes a request for a 2D webpage matching the 3D webpage corresponding to the display command to the 3D web providing server 700, receives the 2D webpage from the 3D web providing server 700, and then displays the received 2D webpage.

Alternatively, if the current status of the mobile terminal 100 does not meet the preset display condition of the 3D webpage, the mobile terminal 100 makes a request for right and left eye images of the 3D webpage corresponding to the display command to the 3D web providing server 700, receives the right and left eye images from the 3D web providing server 700, and then displays either the received right eye image or the received left eye image. In particular, when either the received right eye image or the received left eye image is displayed, the displayed image is 2D.

Meanwhile, the 3D webpage received from the 3D web providing server 700 may be 3D entirely or in part. The mobile terminal 100 can also display the received 3D webpage as it is. Alternatively, the mobile terminal 100 converts the received 3D webpage to a 2D webpage, displays the 2D webpage, converts a user-selected part of the 2D webpage to a 3D part, and then displays the 3D part.

In particular, when a whole webpage including a large volume of text is displayed 3-dimensionally, it may be difficult for a user to recognize the large volume of the 3D type text. Therefore, before the mobile terminal 100 displays a 3D webpage, the mobile terminal 100 checks whether a proportion of the text in the 3D webpage is equal to or greater than a preset proportion. If the text proportion in the 3D webpage is equal to or greater than the preset proportion, the mobile terminal 100 can display 2D text by converting the text in the 3D webpage to the 2D text only. In this instance, if a prescribed text is selected from the displayed 2D text by a user, the mobile terminal 100 can display a 3D text by converting the selected text to the 3D text again.

The mobile terminal 100 checks 3D-supportable contents among the contents of the received 3D webpage and can then display indicator information indicating 3D support possibility by generating the indicator information from the checked contents.

For instance, when 3 images including a $1^{st}$ image, $2^{nd}$ image and $3^{rd}$ image exist in the received 3D webpage, if each of the $1^{st}$ image and the $2^{nd}$ image supports 3D and the $3^{rd}$ image is 2D, the indicator information indicating 3D is displayed within each of the $1^{st}$ and $2^{nd}$ images and the indicator information indicating 2D is displayed within the $3^{rd}$ image.

Thereafter, if the indicator indicating 3D is selected or the $1^{st}$ or $2^{nd}$ image is selected, the mobile terminal 100 makes a request for the selected $1^{st}$ or $2^{nd}$ image to the 3D web providing server 700, receives the requested image, and then displays the received image.

Alternatively, the mobile terminal 100 preferentially displays the contents in the received 3D webpage in 2D irrespective of 3D or 2D, checks 3D supportable contents among the contents in the received 3D webpage, generates indicator information indicating 3D support possibility of each of the checked contents, and then displays the generated indicator information within each of the checked contents. Thereafter, if a specific indicator information is selected from the displayed indicator information, the content corresponding to the selected specific indicator information may be converted and displayed in 3D.

Alternatively, the contents in the displayed 3D webpage may be displayed by being sorted by category. For instance, the contents in the displayed 3D webpage may be displayed by being sorted by category. For example, the contents in the displayed 3D webpage may be displayed by being sorted by category such as news, weather, politics, economy, culture, entertainment, international, society, image, search word ranking, shopping and the like.

In this instance, user's frequency of use of each of the contents in the displayed 3D webpage is gathered per the category, to which the contents belong, by the mobile terminal 100. Subsequently, different 3D depths can be given to the contents or the categories, to which the contents belong, in accordance with the use frequency ranking gathered per the category by the mobile terminal 100, respectively.

For instance, if the use frequency of the contents belonging to the news category, the use frequency of the contents belonging to the politics category and the use frequency of the contents belonging to the entertainment category take the $1^{st}$ ranking, the $2^{nd}$ ranking and the lowest ranking, respectively, the mobile terminal 100 gives a highest 3D depth to the news category taking the $1^{st}$ ranking or the contents belonging to the news category to enable a user to have a nearest view of the corresponding category or contents and also gives a lowest 3D depth to the entertainment category taking the lowest ranking or the contents belonging to the entertainment category to enable the user to have a farthest view. Therefore, the user can identify a ranking of a content, which is frequently viewed by the user, through the 3D depth of the news category or the corresponding contents.

If a specific region is selected from the displayed webpage, the mobile terminal 100 can convert a dimension of the selected region to 2D or 3D.

If a popup window containing specific information is generated and displayed on the displayed 3D webpage, the mobile terminal 100 gives a 3D depth different from that of the 3D webpage to the popup window. Hence, a use can easily identify the popup window. In particular, the mobile terminal 100 can give the 3D depth to enable the popup window to look closer than the 3D webpage.

If a specific 3D content is selected from the 3D webpage and then activated, the mobile terminal 100 can display the selected 3D content as a preview by converting the 3D content to a 2D content during a loading standby time of the selected 3D content. Once the 2D content is fully loaded, the mobile terminal 100 converts the 2D content to the 3D content again and then displays the corresponding 3D content.

The mobile terminal 100 obtains a recently uploaded date and time ranking of each of the 3D contents contained in the 3D webpage and can then give a different 3D depth to each of the 3D contents in accordance with the obtained ranking. In particular, the mobile terminal 100 can give the 3D depth to the corresponding 3D content in a manner that the corresponding 3D content looks closer on the screen in accordance with the recently uploaded date and time ranking which gets higher. Therefore, a user can identify the uploaded date and time ranking of the corresponding 3D content through the 3D depth given to each of the 3D contents.

If a content indicating a search ranking list of search words for a predetermined period of time is selected from the 3D contents contained in the 3D webpage, the mobile terminal 100 displays the search ranking list by giving a 3D depth to each of the search words in a manner that a search word taking a higher ranking looks closer on the screen. Therefore, a user can identify a ranking of the corresponding search word through the 3D depth differently given to each off the search words.

The mobile terminal 100 obtains a user's use frequency ranking for each of the 3D contents or 3D menu function contained in the 3D webpage and can then give a different 3D depth to each of the 3D contents or the 3D menu functions in accordance with the obtained use frequency ranking. In particular, the mobile terminal 100 can give a 3D depth to the 3D content or menu function, which is more frequently used, to look closer on the screen. Hence, a user can identify the use frequency ranking of the corresponding 3D content or menu function through the 3D depth given to the 3D content or menu function.

The mobile terminal 100 can give different 3D depths to the 3D contents previously selected from the 3D contents contained in the 3D webpage by a user and the rest of the 3D contents failing to be selected yet, respectively. In particular, since the unselected 3D contents among the 3D contents contained in the 3D webpage correspond to the information failing to be viewed by the user yet, the mobile terminal 100 may give a 3D depth to the unselected 3D contents to look closer on the screen and may give a 3D depth to the previously selected 3D contents to look farther from the screen.

If the search word input window contained in the 3D webpage is selected, it may be an action for a current user to input a search word. Hence, the mobile terminal 100 can give a 3D depth more than that of the 3D webpage to the search input window to look closer on the screen.

If the 3D webpage containing the 3D contents is an email storage box containing a plurality of emails, the mobile terminal 100 can give different 3D depths to the emails, of which contents are not checked by a user yet, and the emails, of which contents are already checked, among the emails, respectively. In particular, since the unchecked emails among the mails in the email storage box are not read by the user yet, the mobile terminal 100 can give a more 3D depth to the unchecked emails to look closer on the screen and can give a less 3D depth to the checked emails to look farther from the screen.

If the 3D webpage containing the 3D contents is a messenger containing a plurality of chat contents, the mobile terminal 100 obtains recently received time rankings of the chat contents and can then give different 3D depths to the chat contents in accordance with the obtained rankings, respectively. In particular, the mobile terminal 100 can give a more 3D depth to the chat content, which is received more recently, to look closer on the screen and can give a less 3D depth to the chat content, which is received further previously, to look farther from the screen. In doing so, the mobile terminal 100 obtains a chat content corresponding to previously registered friends from the chat contents contained in the messenger and can then give a 3D depth different from those of the rest of the chat contents. In particular, the mobile terminal 100 can give a more 3D depth to the chat content, which correspond to the previously registered friend, to look closer on the screen and can give a less 3D depth to the chat content of a chat counterpart unregistered as a friend to enable the chat content to look farther from the screen.

Meanwhile, the mobile terminal 100 can share the screen of the display unit 151 with at least one external terminal around. In particular, the mobile terminal 100 establishes a communication with the external terminal via a DLNA (digital living network alliance) and/or the like and then transmits a screen image of the display unit 151 to the external terminal in order to share the transmitted screen image in-between. In doing so, if the mobile terminal 100 currently displays the 3D webpage, the mobile terminal 100 can transmit the 3D webpage to the external terminal. In particular, the mobile terminal 100 transmits a signal for querying whether to provide the 3D webpage to the external terminal. If the mobile terminal 100 receives a signal for requesting the 3D webpage from the external terminal, it can transmit the 3D webpage to the external terminal. In this instance, the external terminal may have the above-mentioned 3D webpage display condition set equal to that of the mobile terminal 100. If the 3D webpage displayed on the mobile terminal 100 meets the above-set 3D webpage display condition, the external terminal makes a request for the 3D webpage to the mobile terminal 100, receives the 3D webpage, and then displays the received 3D webpage.

Moreover, the mobile terminal 100 receives the 3D webpage display condition, which is set for the external terminal, from the external terminal. If the 3D webpage to be transmitted meets the 3D webpage of the external terminal, the mobile terminal 100 can transmit the 3D webpage to the external terminal.

While the mobile terminal 100 displays the 3D webpage, if a short-range communication such as Bluetooth and the like is established between the mobile terminal 100 and the external terminal, the mobile terminal 100 receives device information of the external terminal from the external terminal and then checks whether the currently displayed 3D webpage can be displayed by the external terminal based on the received device information. If the currently displayed 3D webpage can be displayed by the external terminal, as a result of the check, the mobile terminal 100 can transmit the 3D webpage to the external terminal so that the 3D webpage can be identically displayed by the external terminal. On the contrary, if the currently displayed 3D webpage can not be displayed by the external terminal, as a result of the check, the mobile terminal 100 can transmit a 3D webpage to the external terminal instead of the 3D webpage so that the 2D webpage can be displayed by the external terminal.

In the following description, a process for providing a 3D webpage of a mobile terminal 100 according to an embodiment of the present invention is explained in detail with reference to FIGS. 7 to 28.

First of all, a process for setting the above-mentioned 3D webpage display condition in the mobile terminal 100 is described in detail with reference to FIGS. 7 and 8 as follows. In particular, FIG. 7 is a flowchart of a process for setting a 3D webpage display condition in a mobile terminal according to an embodiment of the present invention, and FIG. 8 is a diagram of screen configuration of a process for setting a 3D webpage display condition in a mobile terminal according to an embodiment of the present invention.

Figure 7:
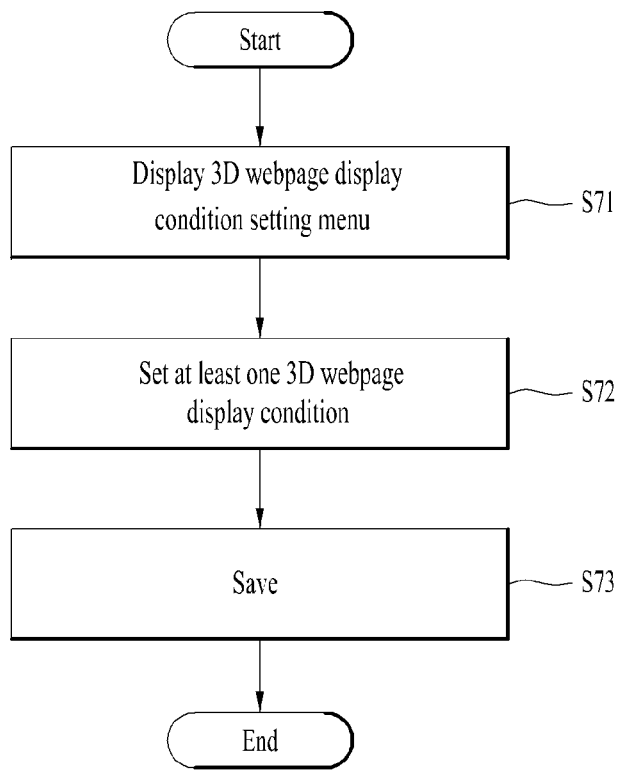
FIG. 7 is a flowchart of a process for setting a 3D webpage display condition in a mobile terminal according to an embodiment of the present invention.
Figure 8:
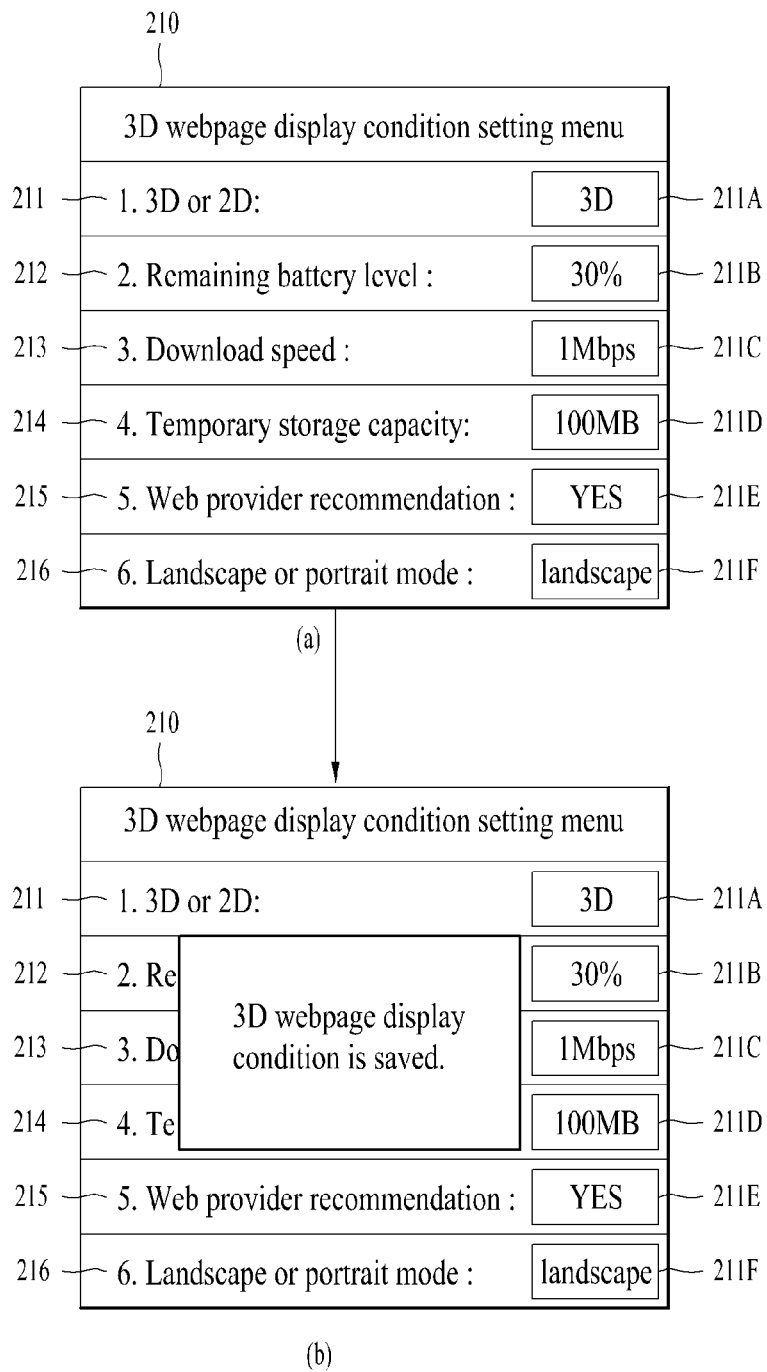
FIG. 8 is a diagram of screen configuration of a process for setting a 3D webpage display condition in a mobile terminal according to an embodiment of the present invention.

Referring to FIGS. 7 and 8, if a 3D webpage display condition setting menu 210 of the present invention is selected via the touchscreen 151 or the user input unit 130, the controller 180 of the mobile terminal 100 displays the selected 3D webpage display condition setting menu 210 (S71) (FIG. 8 (a)).

In this instance, the 3D webpage display condition setting menu 210 includes $1^{st}$ to $6^{th}$ setting menus 211 to 216. The $1^{st}$ setting menu 211 is the menu for setting a webpage display scheme to 3D or 2D. A user can set a webpage display scheme to 3D or 2D via the $1^{st}$ setting menu 211. For instance, FIG. 8 shows that the webpage display scheme is set to the 3D (211A).

The $2^{nd}$ setting menu 212 is the menu for setting a threshold value of a remaining power level of a battery of the mobile terminal 100 capable of providing 3D webpages. For example shown in FIG. 8, if the remaining power level of the battery is 30% or higher (211B), a corresponding 3D webpage is requested, receive and then displayed.

The $3^{rd}$ setting menu 213 is the menu for setting a threshold value of a download speed available for providing a 3D webpage in case of downloading the 3D webpage from the 3D web providing server 700. For example shown in FIG. 8, if the 3D webpage download speed is 1 Mbps (211C) or higher, the 3D webpage is received and displayed.

The $4^{th}$ setting menu 214 is the menu for setting a threshold value of a temporary storage capacity of the memory 160 available for providing a 3D webpage in case of downloading the 3D webpage from the 3D web providing server 700. For example shown in FIG. 8, if the temporary storage capacity becomes 100 MB (211D), the 3D webpage is requested, received and then displayed.

When a user makes a request for an access to a webpage without setting a display scheme of the webpage to 3D or 2D, if a web provider of the requested webpage recommends 3D as a display condition of a 3D webpage, the $5^{th}$ setting menu 215 is the menu for setting whether to display the webpage in 3D. For example shown in FIG. 8, a 3D recommendation made by the web provider is granted, which is indicated as YES (211E). In particular, after the webpage has been initially accessed via the wireless communication unit 110, before the webpage is displayed, if a signal indicating that the 3D is recommended as the display scheme of the webpage is received from the web provider and the 3D recommendation made as the display condition of the webpage by the web provider is granted (i.e., indicated as YES (211E)), the controller 180 makes a request for the webpage in 3D to the web provider, receives the corresponding webpage from the web provider, and then displays the received webpage.

The $6^{th}$ setting menu 215 is the menu for setting a landscape mode or a portrait mode as a display mode of the mobile terminal 100 capable of providing 3D webpages. For example shown in FIG. 8, the display mode of the mobile terminal 100 capable of providing 3D webpages is set to the landscape mode (211F). In particular, although a user has made a request for an access to a specific 3D webpage, if a display mode of the mobile terminal 100 is set as the display condition of the 3D webpage to the landscape mode, the controller 180 may request, receive and display the 3D webpage.

As mentioned in the above description, if at least one display condition is set via the 3D webpage display condition setting menu 210 (S72) (FIG. 8 (a)), the controller 180 saves the set display condition of the 3D webpage in the memory (S73) (FIG. 8 (b)).

In the above description, a process for setting a 3D webpage display condition used to provide a 3D webpage or not is explained in detail with reference to FIGS. 7 and 8.

In the following description, a process for providing a 3D webpage requested by a user based on the above-set 3D webpage display condition is explained in detail with reference to FIGS. 9 to 28. In particular, FIG. 9 is a flowchart of a process for providing a 3D webpage based on a 3D webpage display condition in a mobile terminal according to an embodiment of the present invention, and FIG. 10 is a diagram of screen configuration of a process for providing a 3D webpage based on a 3D webpage display condition in a mobile terminal according to an embodiment of the present invention.

Figure 9:
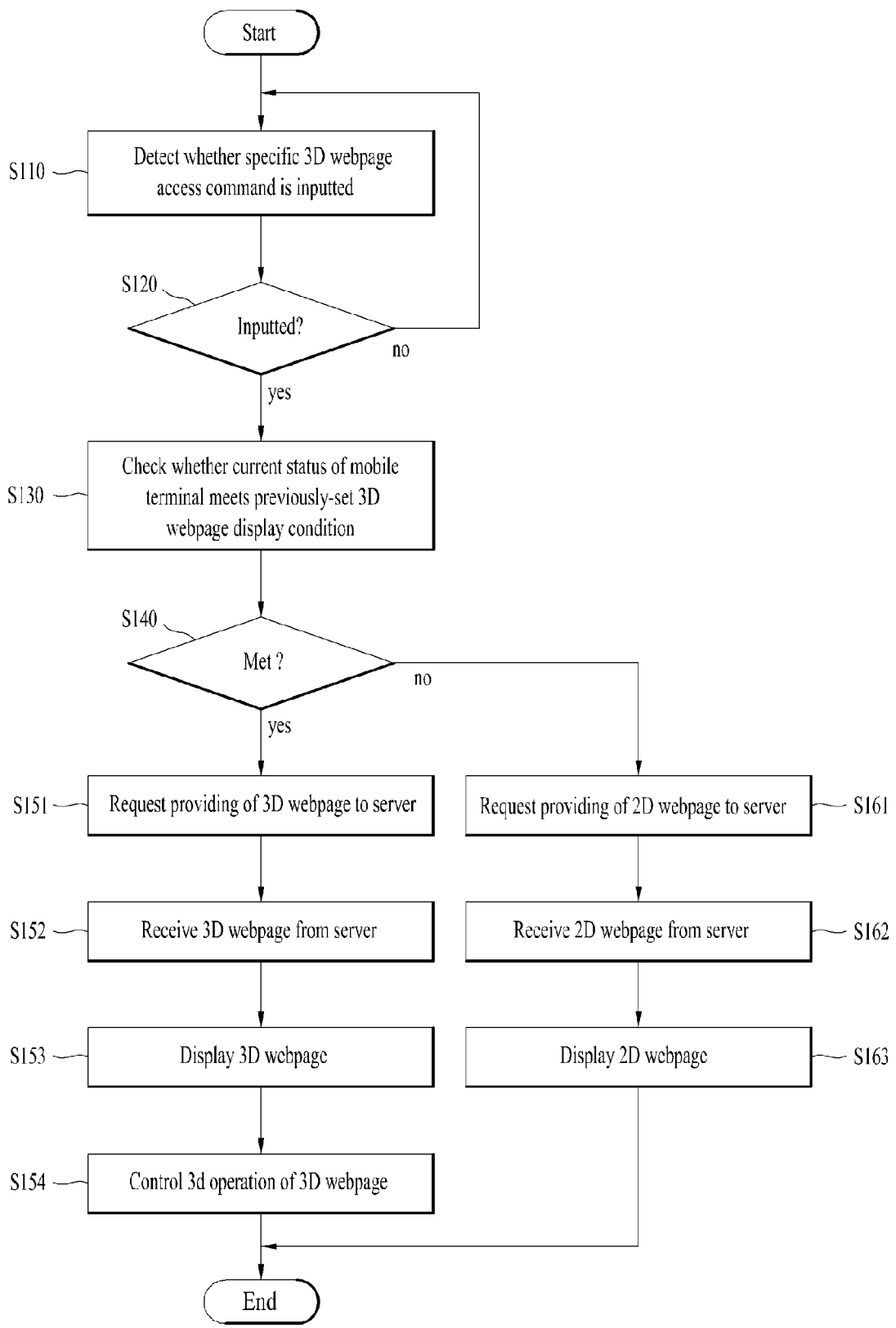
FIG. 9 is a flowchart of a process for providing a 3D webpage based on a 3D webpage display condition in a mobile terminal according to an embodiment of the present invention.

Referring to FIGS. 9 and 10, the controller 180 detects whether a command for an access to a specific 3D webpage is input by a user via the touchscreen 151 or the user input unit 130 (S110). In doing so, the user activates a web browser for providing 3D webpages and selects a desired 3D webpage to access from a plurality of 3D webpages previously bookmarked in the web browser or inputs a URL address of a desired 3D webpage to access in direct to a URL address input widow of the web browser.

If the access command for the access to the 3D webpage is input (S120), the controller 180 may check whether a current status of the mobile terminal 100 meets the 3D webpage display condition described with reference to FIGS. 6 to 8 (S130).

As a result of the check, if the 3D webpage display condition is met (S140), the controller 180 can transmit a signal for requesting a providing of the 3D webpage corresponding to the access command in the step S110 to the 3D web providing server 700 via the wireless communication unit 110 (S151), receives the 3D webpage from the 3D web providing server 700 (S152), displays the received 3D webpage (S153), and controls a 3D display operation of the displayed 3D webpage in accordance with a user command (S154).

On the contrary, as a result of the check, if the 3D webpage display condition is not met, it may mean that the current status of the mobile terminal 100 is not good to provide the 3D webpage to the user, the controller 180 make a request for a webpage display scheme, which was requested by the user in the step S110, to be set to 2D instead of 3D to the 3D web providing server 700 via the wireless communication unit 110 (S161).

Subsequently, the controller 180 receives a 2D webpage from the 3D web providing server 700 instead of the 3D webpage (S162) and then displays the received 2D webpage (S163).

In this instance, as mentioned in the foregoing description with reference to FIGS. 6 to 8, in case that the 3D webpage display condition is the condition that a current mobile terminal 100 is a 3D function supportable terminal, when the access command shown in the step S110 is input, the controller 180 checks an option of the mobile terminal 100. If the checked option indicates that the 3D function is supportable, the controller 180 makes a request for the 3D webpage to the 3D web providing server 700 and then displays the corresponding 3D webpage. If the checked option indicates that the 3D function is not supportable, the controller 180 makes a request for 2D webpage to the 3D web providing server 700 instead of the 3D webpage and then displays the corresponding 2D webpage.

As mentioned in the foregoing description with reference to FIGS. 6 to 8, in case that the 3D webpage display condition is the condition that a user sets a webpage display scheme to 3D, when the access command shown in the step S110 is input, if the webpage display scheme is currently set to the 3D for the mobile terminal 100, the controller 180 makes a request for the 3D webpage to the 3D web providing server 700 and then displays the corresponding 3D webpage. If the webpage display scheme is currently set to 2D for the mobile terminal 100, the controller 180 makes a request for 2D webpage instead of the 3D webpage to the 3D web providing server 700 and then displays the corresponding 2D webpage.

As mentioned in the foregoing description with reference to FIGS. 6 to 8, in case that the 3D webpage display condition is a $1^{st}$ threshold value of a current remaining battery power level available for a 3D webpage providing set by a user, when the access command shown in the step S110 is input, if a current remaining battery power level is equal to or higher than the $1^{st}$ threshold value, the controller 180 makes a request for the 3D webpage to the 3D web providing server 700 and then displays the corresponding 3D webpage. On the contrary, if a current remaining battery level is lower than the $1^{st}$ threshold value, the controller 180 makes a request for 2D webpage instead of the 3D webpage to the 3D web providing server 700 and then displays the corresponding 2D webpage. In particular, if the current reaming battery level is lower than the $1^{st}$ threshold value, since the current battery level is not enough to display the 3D webpage, the controller 180 makes the request for the 2D webpage that requires relatively small battery consumption. In this instance, the $1^{st}$ threshold value can be set by a user. Alternatively, a threshold value optimized according to various simulation results obtained by a manufacturer of the mobile terminal 100 can be set as default.

As mentioned in the foregoing description with reference to FIGS. 6 to 8, in case that the 3D webpage display condition is a $2^{nd}$ threshold value of a download speed available for a 3D webpage providing set by a user, when the access command shown in the step S110 is input, the controller 180 checks a current download speed of the wireless communication unit 110. If the checked download speed is equal to or higher than the $2^{nd}$ threshold value, the controller 180 makes a request for the 3D webpage to the 3D web providing server 700 and then displays the corresponding 3D webpage. If the checked download speed is lower than the $2^{nd}$ threshold value, the controller 180 makes a request for 2D webpage instead of the 3D webpage to the 3D web providing server 700 and then displays the corresponding 2D webpage. In particular, if the current download speed is lower than the $2^{nd}$ threshold value, since the current download speed is not enough to receive and display the 3D webpage having a relatively large size, the controller 180 makes the request for the 2D webpage having a relatively small size. In this instance, the $2^{nd}$ threshold value can be set by a user. Alternatively, a threshold value optimized according to various simulation results obtained by a manufacturer of the mobile terminal 100 can be set as default.

As mentioned in the foregoing description with reference to FIGS. 6 to 8, in case that the 3D webpage display condition is a $3^{rd}$ threshold value of a temporary storage capacity of the memory 160 available for a 3D webpage providing set by a user, when the access command shown in the step S110 is input, the controller 180 checks a current temporary storage capacity related to a web of the memory 160. If the checked temporary storage capacity is equal to or greater than the $3^{rd}$ threshold value, the controller 180 makes a request for the 3D webpage to the 3D web providing server 700 and then displays the corresponding 3D webpage. If the checked temporary storage capacity is smaller than the $3^{rd}$ threshold value, the controller 180 makes a request for 2D webpage instead of the 3D webpage to the 3D web providing server 700 and then displays the corresponding 2D webpage. In particular, if the current temporary storage capacity is smaller than the $3^{rd}$ threshold value, since the current storage capacity is not enough to receive and display the 3D webpage having a relatively large size, the controller 180 makes the request for the 2D webpage having a relatively small size. In this instance, the $3^{rd}$ threshold value can be set by a user. Alternatively, a threshold value optimized according to various simulation results obtained by a manufacturer of the mobile terminal 100 can be set as default.

As mentioned in the foregoing description with reference to FIGS. 6 to 8, in case that the 3D webpage display condition is the condition that a display mode of the mobile terminal 100 is set to landscape mode (or portrait mode), when the access command shown in the step S110 is input, if a current display mode of the mobile terminal 100 is the landscape mode (or portrait mode), the controller 180 makes a request for the 3D webpage to the 3D web providing server 700 and then displays the corresponding 3D webpage. If a current display mode of the mobile terminal 100 is the landscape mode (or portrait mode), the controller 180 makes a request for 2D webpage instead of the 3D webpage to the 3D web providing server 700 and then displays the corresponding 2D webpage.

Next, FIG. 10 (*a*) shows a 3D webpage 300A displayed if a current status of the mobile terminal 100 meets the 3D webpage display condition set by the process shown in FIGS. 6 to 8. FIG. 10 (*b*) shows a 2D webpage 300B displayed instead of the 3D webpage 300A if a current status of the mobile terminal 100 does not meet the 3D webpage display condition.

In the following description, various embodiments of a process for the controller 180 to control a 3D operation of the 3D webpage of the step S154 are explained in detail with reference to FIGS. 11 to 28.

$1^{st}$ to $16^{th}$ embodiments of the present invention explained in the following description may be performed by coupled or combined together entirely or in part. In order to clarify the description of the present invention, the $1^{st}$ to 16 embodiments shall be independently explained in the following description.

($1^{st}$ Embodiment)

According to a $1^{st}$ embodiment of the present invention, after the contents included in the 3D webpage received by the steps S152 and S154 shown in FIG. 9 have been preferentially displayed by being converted to 2D contents, a specific content selected from the 2D contents by a user is displayed by being converted to 3D content again.

In the following description, the $1^{st}$ embodiment of the present invention is explained in detail with reference to FIG. 11.

Figure 11:
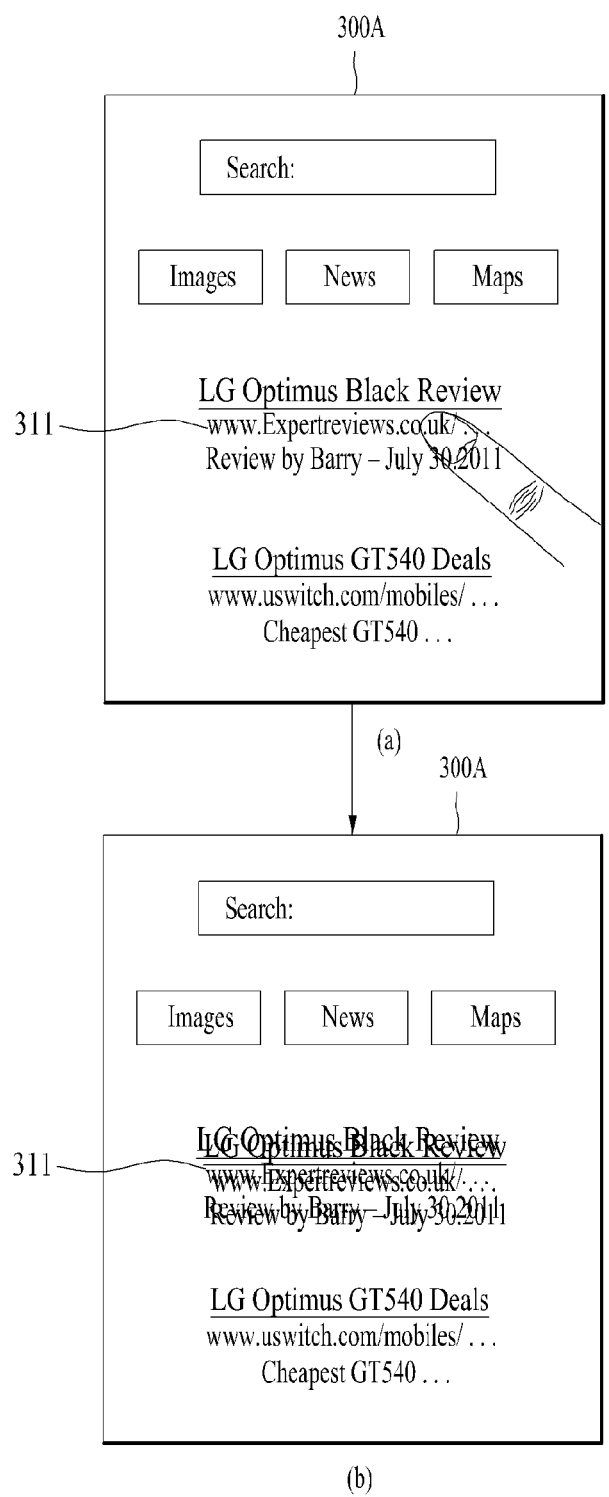
FIG. 11 is a diagram of screen configuration of a process for controlling a 3D operation of a 3D webpage displayed by the processes shown in FIGS. 6 to 10 according to a $1^{st}$ embodiment of the present invention.

FIG. 11 is a diagram of screen configuration of a process for controlling a 3D operation of a 3D webpage displayed by the processes shown in FIGS. 6 to 10 according to a $1^{st}$ embodiment of the present invention.

Referring to FIG. 11 (*a*), if a 3D webpage 300A is received from the 3D web providing server 700 by the process shown in FIGS. 6 to 10, before the controller 180 displays the received 3D webpage 300A, the controller 180 converts the 3D webpage 200 to a 2D webpage and then displays the corresponding 2D webpage. Preferably, after 2D left and right eye images for the creation of the 3D webpage 300A have been received from the 3D web providing server 700, the controller 180 can display one of the received 2D light and right eye images.

If a specific content 311 is selected from the 2D webpage 300A, referring to FIG. 11 (*b*), the controller 180 converts the selected content 311 to a 3D content and then displays the corresponding 3D content. Preferably, if the content 311 is long touched by a user, the controller 180 can convert the long-touched content 311 to a 3D content. In this instance, the long touch may mean the touch performed by maintained for preset duration after an initial touch to the content 311.

In particular, when a webpage including various contents is displayed in 3D, it may cause fatigue to user's eyes. Therefore, according to the $1^{st}$ embodiment of the present invention, even if a 3D webpage is received, the received webpage is preferentially displayed in 2D and a content desired by a user may be displayed only by being converted to a 3D content.

($2^{nd}$ Embodiment)

According to a $2^{nd}$ embodiment of the present invention, if a proportion of a text content in the 3D webpage received by the steps S152 and S154 shown in FIG. 9 is significant, the text content in the 3D webpage is preferentially displayed by being converted to 2D text content. And, a specific text selected from the 2D text content by a user is displayed by being converted to a 3D text again.

In the following description, the $2^{nd}$ embodiment of the present invention is explained in detail with reference to FIG. 12.

Figure 12:
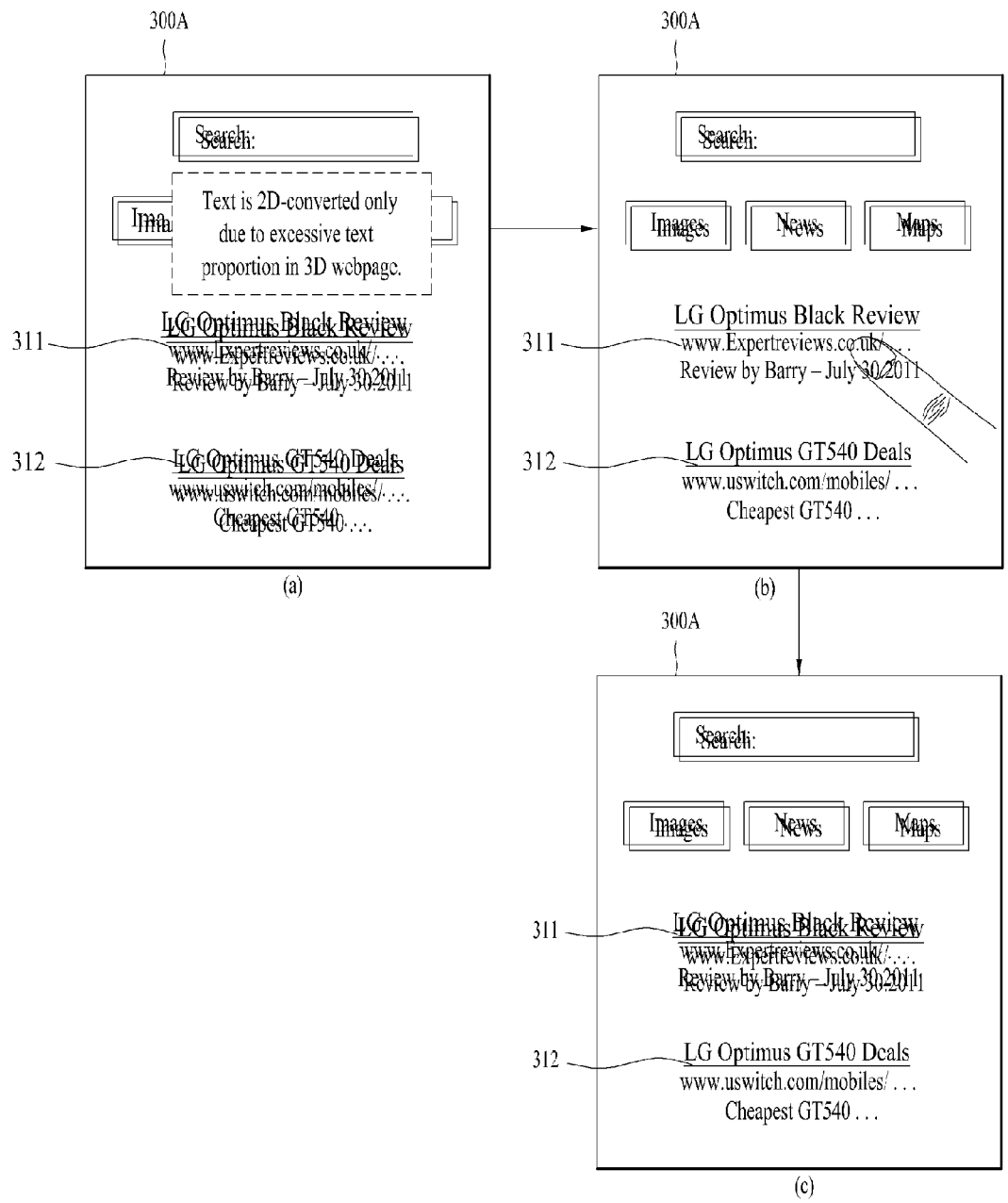
FIG. 12 is a diagram of screen configuration of a process for controlling a 3D operation of a 3D webpage displayed by the processes shown in FIGS. 6 to 10 according to a $2^{nd}$ embodiment of the present invention.

FIG. 12 is a diagram of screen configuration of a process for controlling a 3D operation of a 3D webpage displayed by the processes shown in FIGS. 6 to 10 according to a $2^{nd}$ embodiment of the present invention.

Referring to FIG. 12 (*a*), the controller 180 checks a proportion of text contents 311 and 312 in contents included in the 3D webpage received from the 3D web providing server 700 by the process shown in FIGS. 6 to 10.

If the checked proportion of the text contents 311 and 312 is equal to or greater than a preset proportion value, referring to FIG. 12 (*b*), the controller 180 converts the text contents 311 and 312 included in the 3D webpage 300A to 2D text contents only and then displays the corresponding 2D text contents. In this instance, the proportion value may be previously set by a user or may be set for the mobile terminal 100 in advance. The controller 180 displays such a part of the 3D webpage except the text as a layout, an image, an icon and the like in 3D and also displays the text contents 311 and 312 in 2D by conversion.

In doing so, the controller 180 captures or crops parts of the corresponding text contents 311 and 312 from one of 2D left and right eye images for the creation of the 3D webpage 300A and can then display the captured parts on the corresponding parts of the 3D webpage 300A.

If a specific text content 311 is selected from the 2D text contents 311 and 312, referring to FIG. 12 (c), the controller 180 can display the selected content 311 by converting the selected content 311 to a 3D content.

In particular, when a whole webpage including a considerable volume of text is displayed in 3D, a user may have difficulty in recognizing the large volume of the 3D text with ease and may experience fatigue caused to user's eyes. Therefore, according to the $2^{nd}$ embodiment of the present invention, a text part is preferentially displayed in 2D and the 2D text can be converted to a 3D text again in accordance with a selection made by the user.

($3^{rd}$ Embodiment)

According to a $3^{rd}$ embodiment of the present invention, 3D support availability for the contents included in the 3D webpage received by the steps S152 and S154 shown in FIG. 9 is preferentially checked and an indication information indicating a presence or non-presence of the 3D support availability is then displayed on each of the contents.

In the following description, the $3^{rd}$ embodiment of the present invention is explained in detail with reference to FIG. 13.

FIG. 13 is a diagram of screen configuration of a process for controlling a 3D operation of a 3D webpage displayed by the processes shown in FIGS. 6 to 10 according to a $3^{rd}$ embodiment of the present invention.

Referring to FIG. 13 (a), the controller 180 displays a 3D webpage 300A received from the 3D web providing server 700, obtains 3D support available contents from contents included in the 3D webpage 300A, creates $1^{st}$ and $2^{nd}$ indicator information 411 and 412, each of which indicates a presence or non-presence of 3D support availability, and then displays the $1^{st}$ and $2^{nd}$ indicator information 411 and 412 within the obtained contents, respectively.

In particular, the $1^{st}$ indicator information 411 indicates that a 3D support is available for the corresponding content. Yet, the $2^{nd}$ indicator information 412 indicates that a 3D support is not available for the corresponding content and that a 2D support is available for the corresponding content.

For instance, referring to FIG. 13 (a), within the 3D webpage 300A, a search input window (Search) and category menus (Image, News, Maps) are 3D contents but text contents (LG Optimus Black . . . , LG Optimus GT540 . . . ) are 2D contents. The controller 180 displays the $1^{st}$ indicator information 411 on each of the search input window (Search) and category menus (Image, News, Maps) and also displays the $2^{nd}$ indicator information 411 on each of the text contents (LG Optimus Black . . . , LG Optimus GT540 . . . ).

Referring to FIG. 13 (b), if a 3D webpage 300A is received from the 3D web providing server 700, before the controller 180 displays the received 3D webpage 300A, the controller 180 converts the 3D webpage 300A to a 2D webpage and then displays the corresponding 2D webpage.

Subsequently, the controller 180 obtains 3D support available contents from contents included in the 3D webpage 300A, creates the $1^{st}$ and $2^{nd}$ indicator information 411 and 412, and then displays the created $1^{st}$ and $2^{nd}$ indicator information 411 and 412 on corresponding content positions within the displayed 2D webpage 300B, respectively.

Thereafter, if the $1^{st}$ indicator information 411 is selected, the controller 180 converts the corresponding content to a 3D content again and then displays the corresponding 3D content.

In particular, the $3^{rd}$ embodiment of the present invention provides a user with indicator information indicating 3D or 2D provided to each content included in 3D webpage, thereby enabling the user to recognize whether the corresponding content included in the 3D webpage is 3D or 2D clearly and quickly.

($4^{th}$ Embodiment)

According to a $4^{th}$ embodiment of the present invention, use frequencies of the contents available for the 3D webpage received by the steps S152 and S154 shown in FIG. 9 are obtained by counting per category to which the contents belong and different 3D depths are then given to the contents in accordance with the obtained use frequency ranking per category, respectively.

Figure 14:
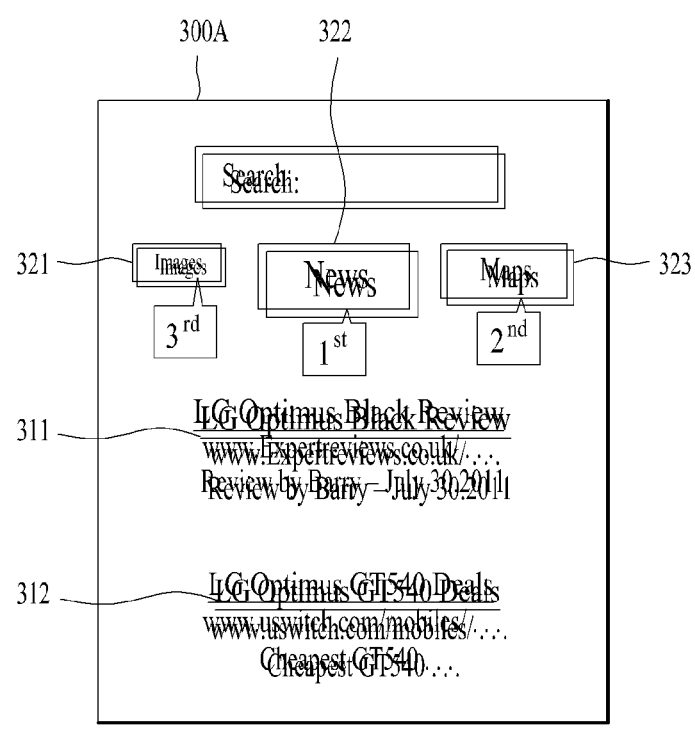
FIG. 14 is a diagram of screen configuration of a process for controlling a 3D operation of a 3D webpage displayed by the processes shown in FIGS. 6 to 10 according to a $4^{th}$ embodiment of the present invention.

In the following description, the $4^{th}$ embodiment of the present invention is explained in detail with reference to FIG. 14. FIG. 14 is a diagram of screen configuration of a process for controlling a 3D operation of a 3D webpage displayed by the processes shown in FIGS. 6 to 10 according to a $4^{th}$ embodiment of the present invention.

Referring to FIG. 14, a 3D webpage 300A received from the 3D web providing server 700 includes category menus 321 to 323 and each of the category menus 321 to 323 includes contents belonging to each corresponding category. In particular, the 3D webpage 300A displays the contents by categorizing them by category.

For instance, if the category menu Images 321 is selected, the controller 180 makes a request for the contents belonging to the category menu Images 321 via the wireless communication unit 110, receives the contents via the wireless communication unit 110, and then displays the received contents.

After the 3D webpage 300A has been displayed, the controller 180 obtains use frequency rankings of the contents included in each of the category menus 321 to 323 within the 3D webpage 300A by counting per the category to which the contents belong.

In accordance with the obtained use frequency rankings, the controller 180 can give different 3D depths to the category menus 321 to 323, respectively.

For instance, referring to FIG. 14, the use frequency of the contents belonging to the category menu News 322 is ranked $1^{st}$, the use frequency of the contents belonging to the category menu Maps 323 is ranked $2^{nd}$, and the use frequency of the contents belonging to the category menu Images 321 is ranked $3^{rd}$.

In this instance, the controller 180 gives a greatest 3D depth to the $1^{st}$ ranked category menu 322 to look closet to a user on the screen and gives a smallest 3D depth to the $3^{rd}$ ranked category menu Images 321 to look farthest from the user on the screen. In particular, the user sees the 3D depths respectively given to the category menus 321 to 323, thereby identifying the ranking of the category frequently used by the user.

($5^{th}$ Embodiment)

According to a $5^{th}$ embodiment of the present invention, a desired part within the 3D webpage displayed by the steps S152 and S154 shown in FIG. 9 is specified by a user and then converted to 2D or 3D part.

In the following description, the $5^{th}$ embodiment of the present invention is explained in detail with reference to FIG. 15.

Figure 15:
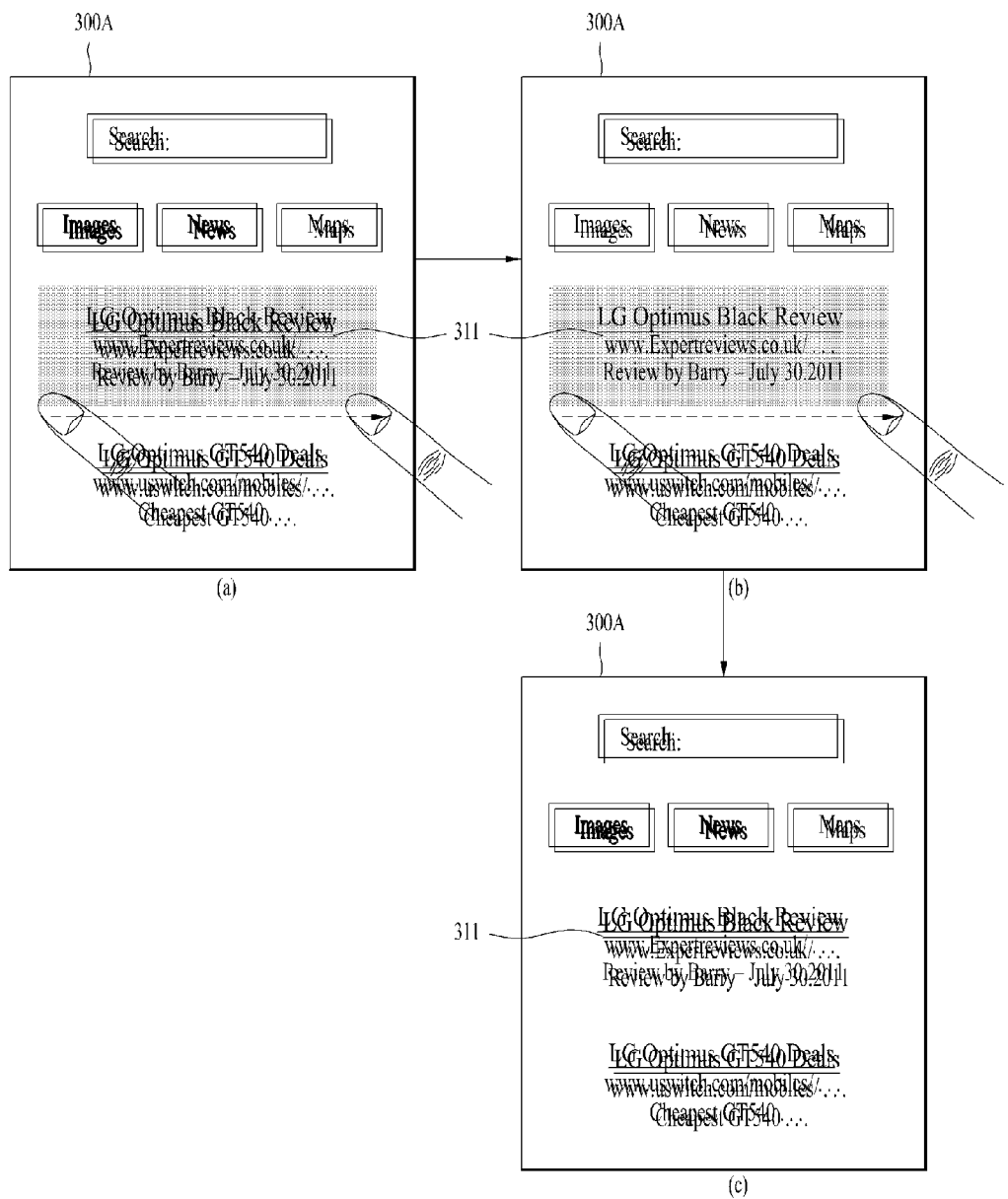
FIG. 15 is a diagram of screen configuration of a process for controlling a 3D operation of a 3D webpage displayed by the processes shown in FIGS. 6 to 10 according to a $5^{th}$ embodiment of the present invention.

FIG. 15 is a diagram of screen configuration of a process for controlling a 3D operation of a 3D webpage displayed by the processes shown in FIGS. 6 to 10 according to a 5$^{th}$ embodiment of the present invention.

Referring to FIG. 15, while a 3D webpage 300A received from the 3D web providing server 700 is displayed, a specific part 311 in the 3D webpage 300A is specified (FIG. 15 (a)). If the specified part 311 is currently 3D, the controller 180 converts the specified part 311 to a 2D part and then displays the corresponding 2D part (FIG. 15 (b)).

Referring to FIG. 15, while a 3D webpage 300A received from the 3D web providing server 700 is displayed, a specific part 311 in the 3D webpage 300A is specified (FIG. 15 (b)). If the specified part 311 is currently 2D, the controller 180 converts the specified part 311 to a 3D part and then displays the corresponding 3D part (FIG. 15 (c)).

In particular, a user specifies a desired part within the 3D webpage 300A and can then freely view the specified part in 2D or 3D.

(6$^{th}$ Embodiment)

According to a 6$^{th}$ embodiment of the present invention, if a new 3D webpage is created on the 3D webpage displayed by the steps S152 and S154 shown in FIG. 9, a 3D depth of the new 3D webpage is set different from that of the former 3D webpage.

In the following description, the 6$^{th}$ embodiment of the present invention is explained in detail with reference to FIG. 16.

Figure 16:
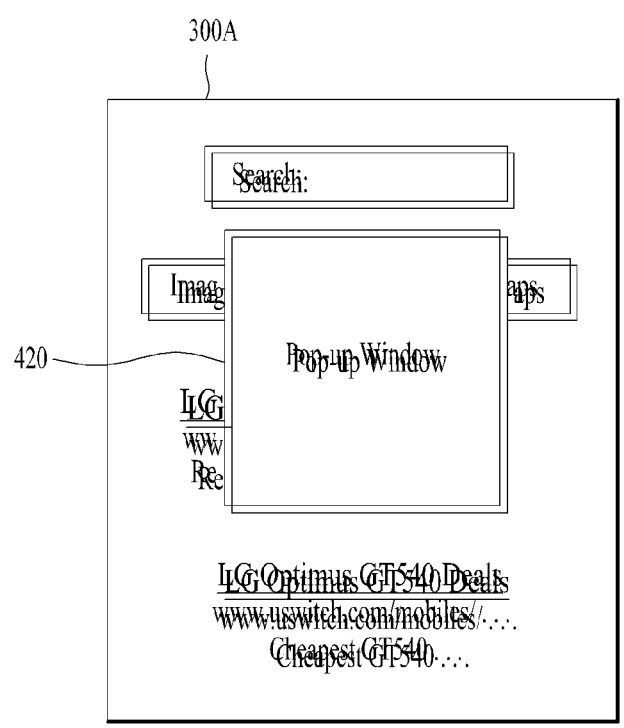
FIG. 16 is a diagram of screen configuration of a process for controlling a 3D operation of a 3D webpage displayed by the processes shown in FIGS. 6 to 10 according to a $6^{th}$ embodiment of the present invention.

FIG. 16 is a diagram of screen configuration of a process for controlling a 3D operation of a 3D webpage displayed by the processes shown in FIGS. 6 to 10 according to a 6$^{th}$ embodiment of the present invention.

Referring to FIG. 16, while a 3D webpage 300A received from the 3D web providing server 700 is displayed, as a specific content is selected from the 3D webpage 300A, if a new webpage window or a popup window 420 including specific information is created, the controller 180 gives the new 3D webpage window or the popup window 420 a 3D depth different from that of the 3D webpage 300A, thereby facilitating a user to identify the new 3D webpage window or the popup window 420. In particular, the controller 180 gives a more 3D depth to the new 3D webpage window or the popup window 420 to look closer than the 3D webpage 300A.

(7$^{th}$ Embodiment)

According to a 7$^{th}$ embodiment of the present invention, if a specific 3D content is selected and activated on the 3D webpage displayed by the steps S152 and S154 shown in FIG. 9, the 3D content is converted to a 2D content. In addition, this 2D content keeps being displayed during a loading standby time until the 3D content is fully loaded. Once the 3D content is fully loaded, an activated screen of the 3D content is displayed.

In the following description, the 7$^{th}$ embodiment of the present invention is explained in detail with reference to FIG. 17. In particular, FIG. 17 is a diagram of screen configuration of a process for controlling a 3D operation of a 3D webpage displayed by the processes shown in FIGS. 6 to 10 according to a 7$^{th}$ embodiment of the present invention.

Figure 17:
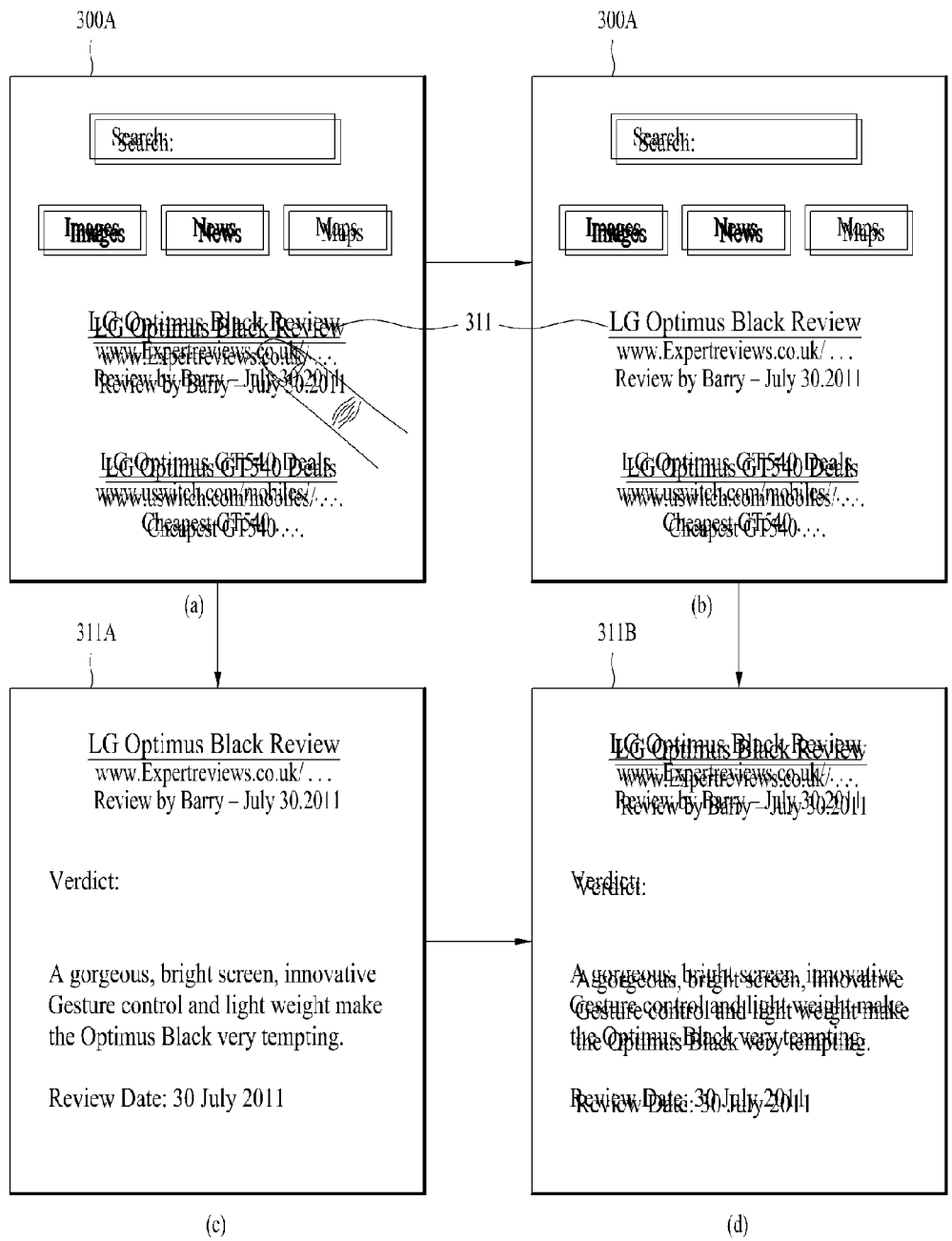
FIG. 17 is a diagram of screen configuration of a process for controlling a 3D operation of a 3D webpage displayed by the processes shown in FIGS. 6 to 10 according to a $7^{th}$ embodiment of the present invention.

Referring to FIG. 17, if a specific content 311 is selected from a 3D webpage 300A (FIG. 17 (a)), the controller 180 converts the 3D content to a 2D content and then displays the 2D content during a loading standby time of the selected content 311 (FIG. 17 (b)). If a loading of the 3D content 31 is completed, the controller displays a 3D activated screen 311B of the 3D content 311 (FIG. 17 (d)).

In doing so, for example, FIG. 17 shows that the selected content 311 is a hyperlink that is linking to a specific webpage.

Referring to FIG. 17 (c), if a specific content 311 is selected from a 3D webpage 300A, the controller 180 can display a 2D activated screen 311A of the 3D content 311 during a loading standby time of the selected content 311. If a loading of the 3D content 311 is completed, the controller 180 can displays a 3D activated screen 311B of the 3D content 311 (FIG. 17 (d)).

(8$^{th}$ Embodiment)

According to an 8$^{th}$ embodiment of the present invention, upload date and time rankings of contents included in the 3D webpage displayed by the steps S152 and S154 shown in FIG. 9 are checked. When the 3D webpage is displayed, different 3D depths are given to the contents in accordance with the checked upload date and time rankings, respectively.

In the following description, the 8$^{th}$ embodiment of the present invention is explained in detail with reference to FIG. 18. In particular, FIG. 18 is a diagram of screen configuration of a process for controlling a 3D operation of a 3D webpage displayed by the processes shown in FIGS. 6 to 10 according to an 8$^{th}$ embodiment of the present invention.

Figure 18:
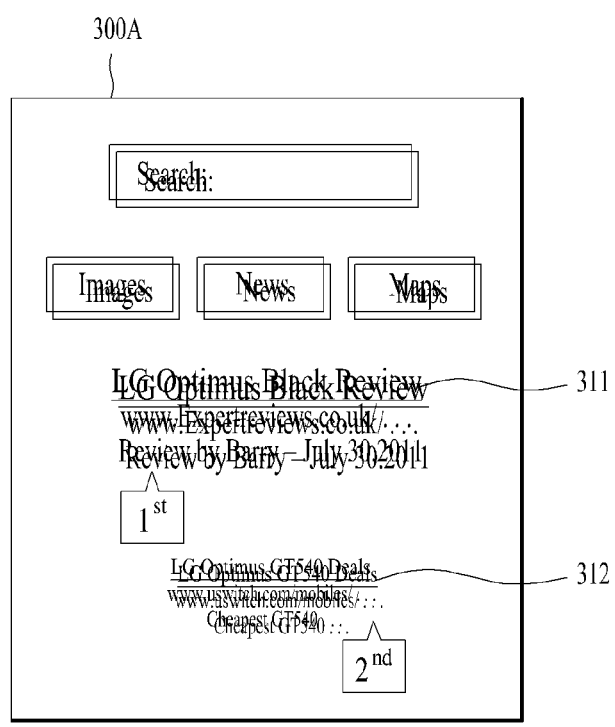
FIG. 18 is a diagram of screen configuration of a process for controlling a 3D operation of a 3D webpage displayed by the processes shown in FIGS. 6 to 10 according to an $8^{th}$ embodiment of the present invention.

Referring to FIG. 18, if a 3D webpage 300A is received from the 3D web providing server 700, the controller 180 checks an upload date and time rankings of contents 311 and 312 included in the 3D webpage 300A. In this instance, various information including the upload date and time of the content 311, the upload date and time of the content 312 and the like are included in the 3D webpage 300A received from the 3D web providing server 700.

The controller 180 gives different 3D depths to the contents 311 in accordance with the checked upload date and time rankings, respectively. For instance, referring to FIG. 18, the upload ranking of the 1$^{st}$ content 311 is 1$^{st}$ and the upload ranking of the 2$^{nd}$ content 312 is 2$^{nd}$.

In this instance, the controller 180 gives a greatest 3D depth to the 1$^{st}$ ranked 1$^{st}$ content 311 to look closest to a user on the screen and also gives a smallest 3D depth to the 2$^{nd}$ ranked 2$^{nd}$ content 312 to look farthest from the user on the screen. In particular, the user can identify the upload rankings of the contents 311 and 312 by recognizing the 3D depths respectively given to the contents 311 and 312, respectively.

(9$^{th}$ Embodiment)

According to a 9$^{th}$ embodiment of the present invention, if a content indicating a real-time search ranking list for a plurality of search words is selected from a plurality of contents included in the 3D webpage displayed by the steps S152 and S154 shown in FIG. 9, different 3D depths are given to the search words in accordance with search rankings of the search words, respectively.

In the following description, the 9$^{th}$ embodiment of the present invention is explained in detail with reference to FIG. 19. In particular, FIG. 19 is a diagram of screen configuration of a process for controlling a 3D operation of a 3D webpage displayed by the processes shown in FIGS. 6 to 10 according to a 9$^{th}$ embodiment of the present invention.

Figure 19:
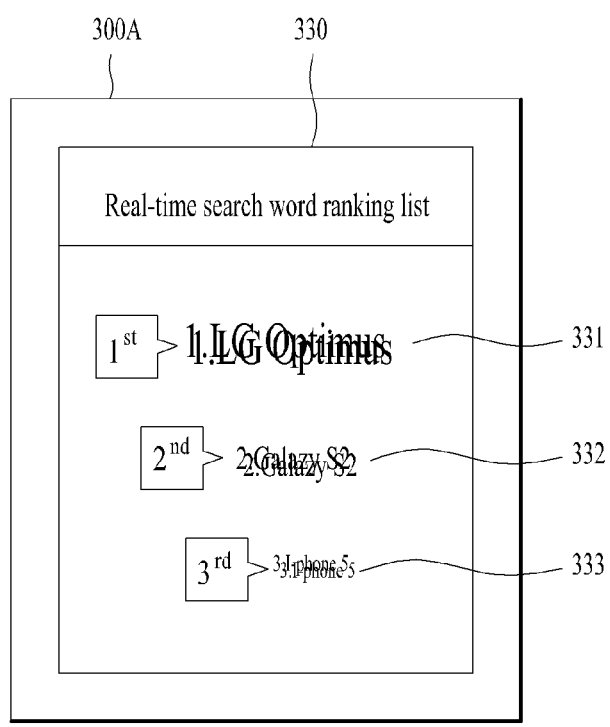
FIG. 19 is a diagram of screen configuration of a process for controlling a 3D operation of a 3D webpage displayed by the processes shown in FIGS. 6 to 10 according to a $9^{th}$ embodiment of the present invention.

Referring to FIG. 19, if a content corresponding to a real-time search ranking list 330 is selected from the contents in a 3D webpage 300A, before the controller 180 displays the selected real-time search ranking list 330, the controller 180 checks rankings of search words 331 to 333 included in the list 330. In this instance, the real-time search ranking list 330 is the list of search words frequently used during a preset period of time (e.g., a day, a week, a month, etc.).

In accordance with the checked real-time search rankings, the controller 180 gives different 3D depths to the search words 331 to 333, respectively.

For instance, referring to FIG. 19, the real-time search ranking of the search word 'LG Optimus' 331 is ranked $1^{st}$, the real-time search ranking of the search word 'Galaxy S2' is ranked $2^{nd}$, and the real-time search ranking of the search word 'I-phone 5' 333 is ranked $3^{rd}$.

In this instance, the controller 180 gives a greatest 3D depth to the 1st ranked search word 'LG Optimus' 331 to look closest to a user on the screen and also gives a smallest 3D depth to the $3^{rd}$ ranked search word 'I-phone 5' 333 to look farthest from the user on the screen. In particular, the user can identify the real-time search rankings of the search words 331 to 333 by recognizing the 3D depths respectively given to the search words 331 to 333, respectively.

($10^{th}$ Embodiment)

According to a $10^{th}$ embodiment of the present invention, after use frequency rankings of menu functions or contents included in the 3D webpage displayed by the steps S152 and S154 shown in FIG. 9 have been checked, different 3D depths are given to the menu functions or the contents in accordance with the checked use frequency rankings, respectively.

In the following description, the $10^{th}$ embodiment of the present invention is explained in detail with reference to FIG. 20. In particular, FIG. 20 is a diagram of screen configuration of a process for controlling a 3D operation of a 3D webpage displayed by the processes shown in FIGS. 6 to 10 according to a $10^{th}$ embodiment of the present invention.

Figure 20:
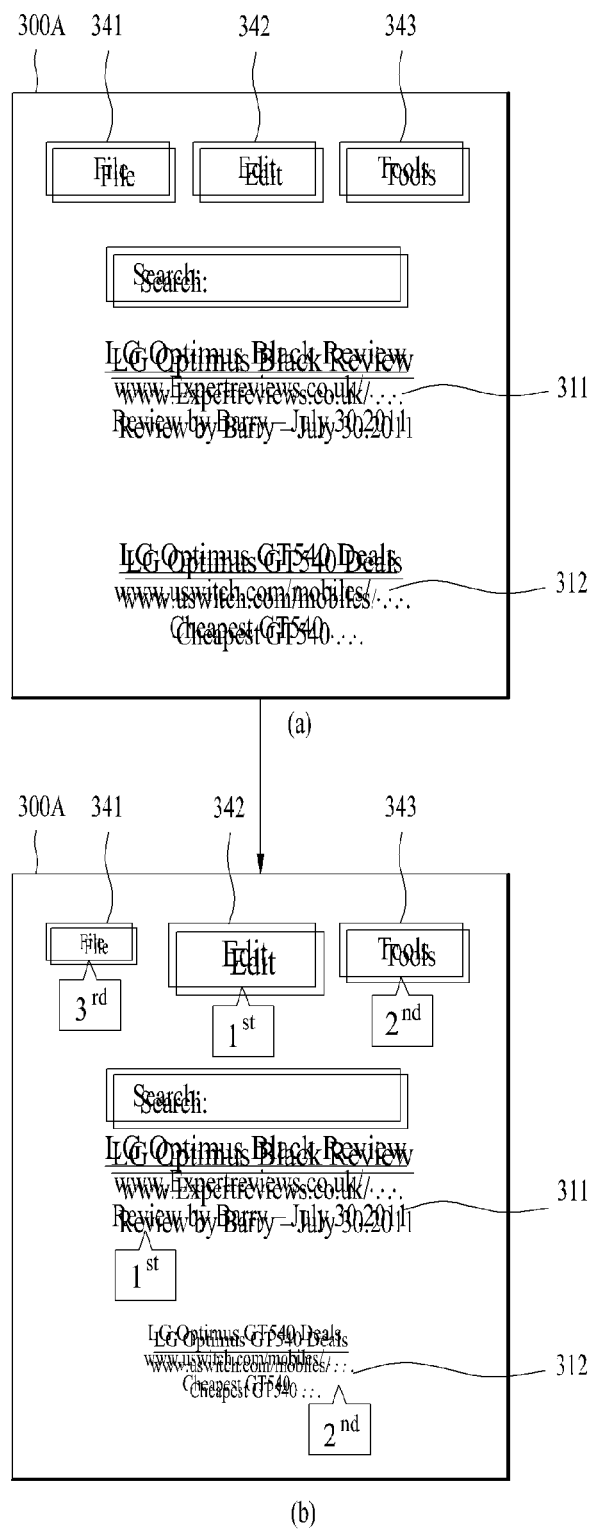
FIG. 20 is a diagram of screen configuration of a process for controlling a 3D operation of a 3D webpage displayed by the processes shown in FIGS. 6 to 10 according to a $10^{th}$ embodiment of the present invention.

Referring to FIG. 20 (a), a 3D webpage 300A including 3D contents 311 and 312 and 3D menu functions 341 to 343 is displayed on the touchscreen 151.

Referring to FIG. 20 (b), the controller 180 can check user's use frequency rankings of the 3D contents 311 and 312 and/or the 3D menu functions 341 to 343 and can then give different 3D depths to the 3D contents 311 and 312 and/or the 3d menu functions 341 to 343 in accordance with the checked use frequency rankings, respectively.

For instance, referring to FIG. 20 (b), the use frequency ranking of the $1^{st}$ text content 311 of the 3D contents 311 and 312 is ranked $1^{st}$ and the use frequency ranking of the $2^{nd}$ text content 312 of the 3D contents 311 and 312 is $2^{nd}$. Among the 3D menu functions 341 to 343, the use frequency ranking of the menu function 'File' 341 is ranked $1^{st}$, the use frequency ranking of the menu function 'Edit' 342 is ranked $2^{nd}$, and the use frequency ranking of the menu function 'Tools' 343 is ranked $3^{rd}$.

In this instance, the controller 180 gives a 3D depth to the $1^{st}$ ranked $1^{st}$ text content 311 to look closer to a user on the screen than the $2^{nd}$ ranked $2^{nd}$ text content 312 and also gives a 3D depth to the $1^{st}$ ranked menu function 'File' 341 to look closer to a user on the screen than the $2^{nd}$ ranked menu function 'Edit' 342 or the $3^{rd}$ ranked menu function 'Tools' 343. In particular, the user can identify the user's use frequency rankings of the 3D contents 311 and 312 or the 3D menu functions 341 to 343 by recognizing the 3D depths respectively given to the 3D contents 311 and 312 or the 3D menu functions 341 to 343, respectively.

($11^{th}$ Embodiment)

According to an $11^{th}$ embodiment of the present invention, different 3D depths are given to 3D contents previously selected by a user from the contents included in the 3D webpage displayed by the steps S152 and S154 shown in FIGS. 9 and 3D contents unselected yet from the contents, respectively.

In the following description, the $11^{th}$ embodiment of present invention is explained in detail with reference to FIG. 21. In particular, FIG. 21 is a diagram of screen configuration of a process for controlling a 3D operation of a 3D webpage displayed by the processes shown in FIGS. 6 to 10 according to an $11^{th}$ embodiment of the present invention.

Figure 21:
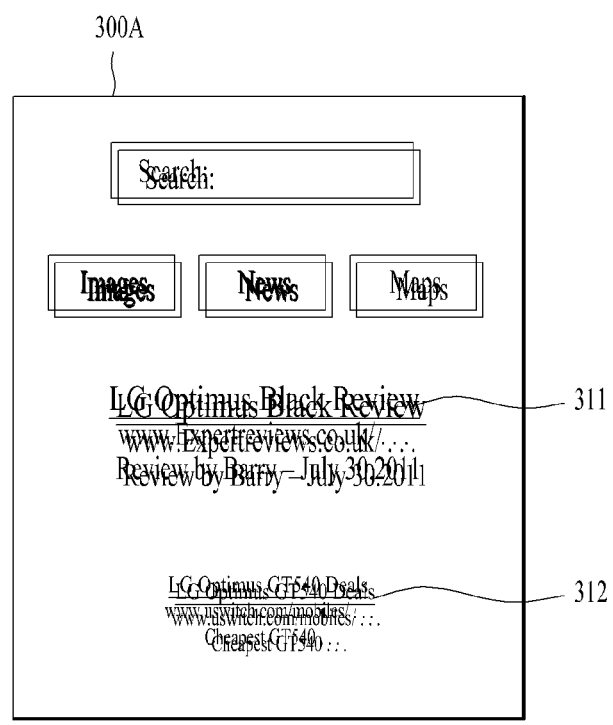
FIG. 21 is a diagram of screen configuration of a process for controlling a 3D operation of a 3D webpage displayed by the processes shown in FIGS. 6 to 10 according to an $11^{th}$ embodiment of the present invention.

Referring to FIG. 21, the controller 180 obtains a 3D content 312 previously selected by a user and an unselected 3D content 311 from the contents 311 and 312 within a 3D webpage 300A. The controller 180 then gives different 3D depths to the previously-selected 3D content 312 and the unselected 3D content 311, respectively.

In particular, since the 3D content 311 unselected yet from the 3D contents 311 and 312 is the information that has not been viewed by a user, the controller 180 gives a more 3D depth to the unselected 3D content 311 to look closer on the screen and also gives a less 3D depth to the previously-selected 3D content 312 to look farther from the screen.

($912^{th}$ Embodiment)

According to a $12^{th}$ embodiment of the present invention, if a 3D search word input window is selected from 3D contents included in the 3D webpage displayed by the steps S152 and S154 shown in FIG. 9, a 3D depth more than that of the 3D webpage is given to the selected 3D search word input window.

In the following description, the $12^{th}$ embodiment of the present invention is explained in detail with reference to FIG. 22. In particular, FIG. 22 is a diagram of screen configuration of a process for controlling a 3D operation of a 3D webpage displayed by the processes shown in FIGS. 6 to 10 according to a $12^{th}$ embodiment of the present invention.

Figure 22:
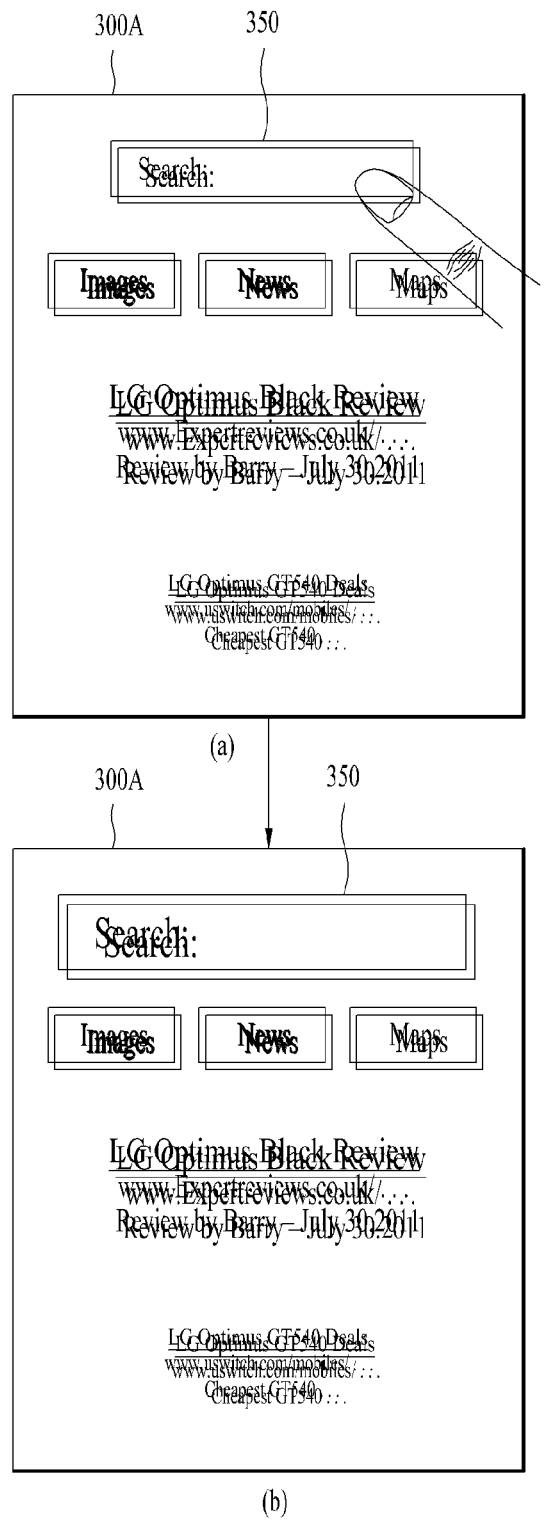
FIG. 22 is a diagram of screen configuration of a process for controlling a 3D operation of a 3D webpage displayed by the processes shown in FIGS. 6 to 10 according to a $12^{th}$ embodiment of the present invention.

Referring to FIG. 22, if a 3D search word input window 350 is selected from a 3D webpage 300A (FIG. 22 (a)), the controller 180 can give a 3D depth to the selected 3D search word input window 350 to look closest on the screen among contents within the 3D webpage 300A.

In particular, since a user selects the 3D search word input window 350 as an action to input a search word to the 3D search word input window 350, the controller 180 can give a 3D depth to the 3D search word input window 350 to look closest to the user on the screen in order to facilitate a user's search word input.

($13^{th}$ Embodiment)

According to a $13^{th}$ embodiment of the present invention, if an email storage box is selected from contents in the 3D webpage displayed by the steps S152 and S154 shown in FIG. 9, different 3D depths are given to an email, of which content is checked by a user, and an email, of which content is not checked by the user, among emails received and saved in the email storage box, respectively.

In the following description, the $13^{th}$ embodiment of the present invention is explained in detail with reference to FIG. 23. In particular, FIG. 23 is a diagram of screen configuration of a process for controlling a 3D operation of a 3D webpage displayed by the processes shown in FIGS. 6 to 10 according to a $13^{th}$ embodiment of the present invention.

Figure 23:
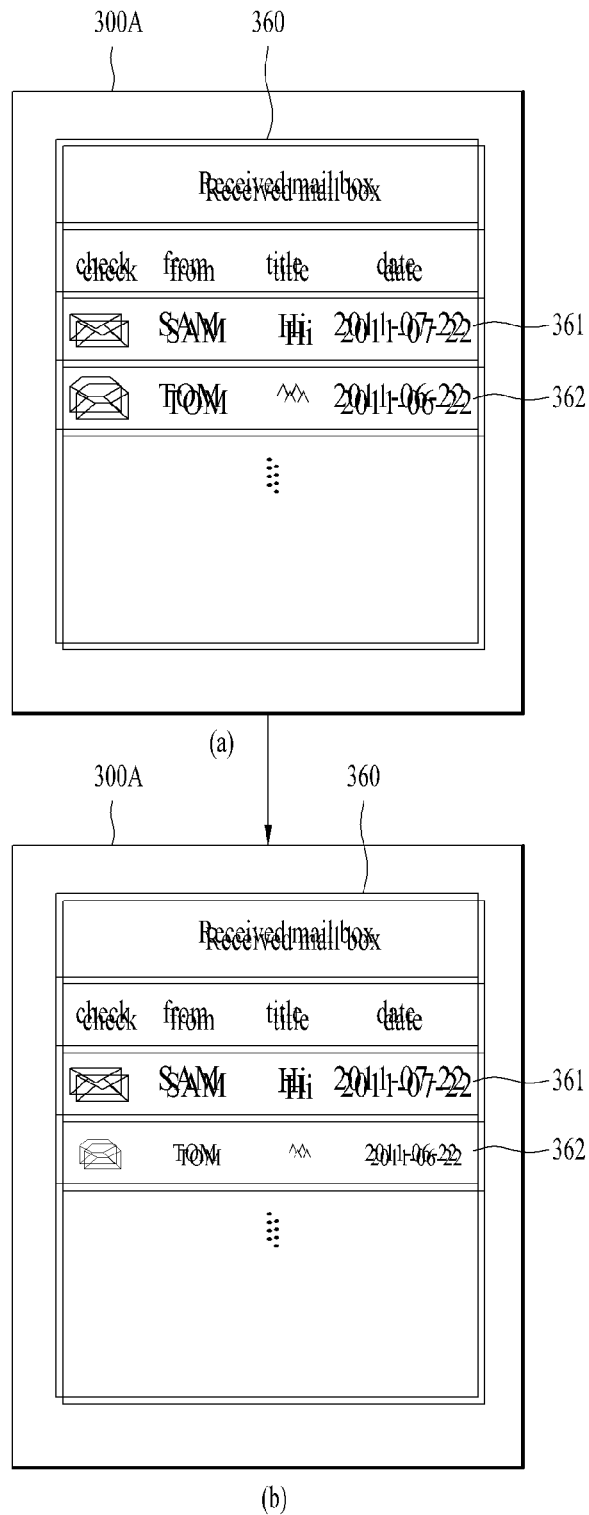
FIG. 23 is a diagram of screen configuration of a process for controlling a 3D operation of a 3D webpage displayed by the processes shown in FIGS. 6 to 10 according to a $13^{th}$ embodiment of the present invention.

Referring to FIG. 23 (a), a 3D webpage 300A including contents may become an email storage box 360 including a plurality of received emails. Alternatively, the email storage box 360 may become one of the contents in the 3D webpage 300A.

In the following description with reference to FIG. 23, assume that the email storage box 360 is one of the contents in the 3D webpage 300A. Referring to FIG. 23 (a), if an email storage box 360 is selected from contents in a 3D webpage 300A, the controller 180 can activate and display the selected email storage box 360.

In doing so, according to a related art, a text of the $1^{st}$ email 361, of which content is unchecked by a user, among the received emails 361 and 362 in the email storage box 360 is displayed thick but a text of the $2^{nd}$ email 362, of which content is checked by the user, is displayed thin.

On the other hand, according to an embodiment of the present invention, in order for a user to identify the $1^{st}$ email 361, of which content is unchecked, through a 3D depth, the controller 180 gives a 3D depth more than that of the $2^{nd}$ email 362 to the $1^{st}$ email 361 to enable the $1^{st}$ email 361 to look closer than the $2^{nd}$ email 362 on the screen.

Optionally, it can identically apply the process for the email storage box 360 shown in FIG. 23 to a received message box. In particular, a 3D depth more than that of a message, of which content is checked, in the received message box may be given to a message, of which content is unchecked, in the received message box (not shown in FIG. 23).

($14^{th}$ Embodiment)

According to a $14^{th}$ embodiment of the present invention, in case that the 3D webpage displayed by the steps S152 and S154 shown in FIG. 9 is a chat messenger containing chat contents of a chat with a plurality of chat members, different 3D depths are given to the chat contents in accordance with recently transmitted/received time rankings, respectively, or a different 3D depth may be given to each of the chat contents in accordance with a presence or non-presence of friend registration.

In the following description, the $14^{th}$ embodiment of the present invention is explained in detail with reference to FIG. 24. In particular, FIG. 24 is a diagram of screen configuration of a process for controlling a 3D operation of a 3D webpage displayed by the processes shown in FIGS. 6 to 10 according to a $14^{th}$ embodiment of the present invention.

Figure 24:
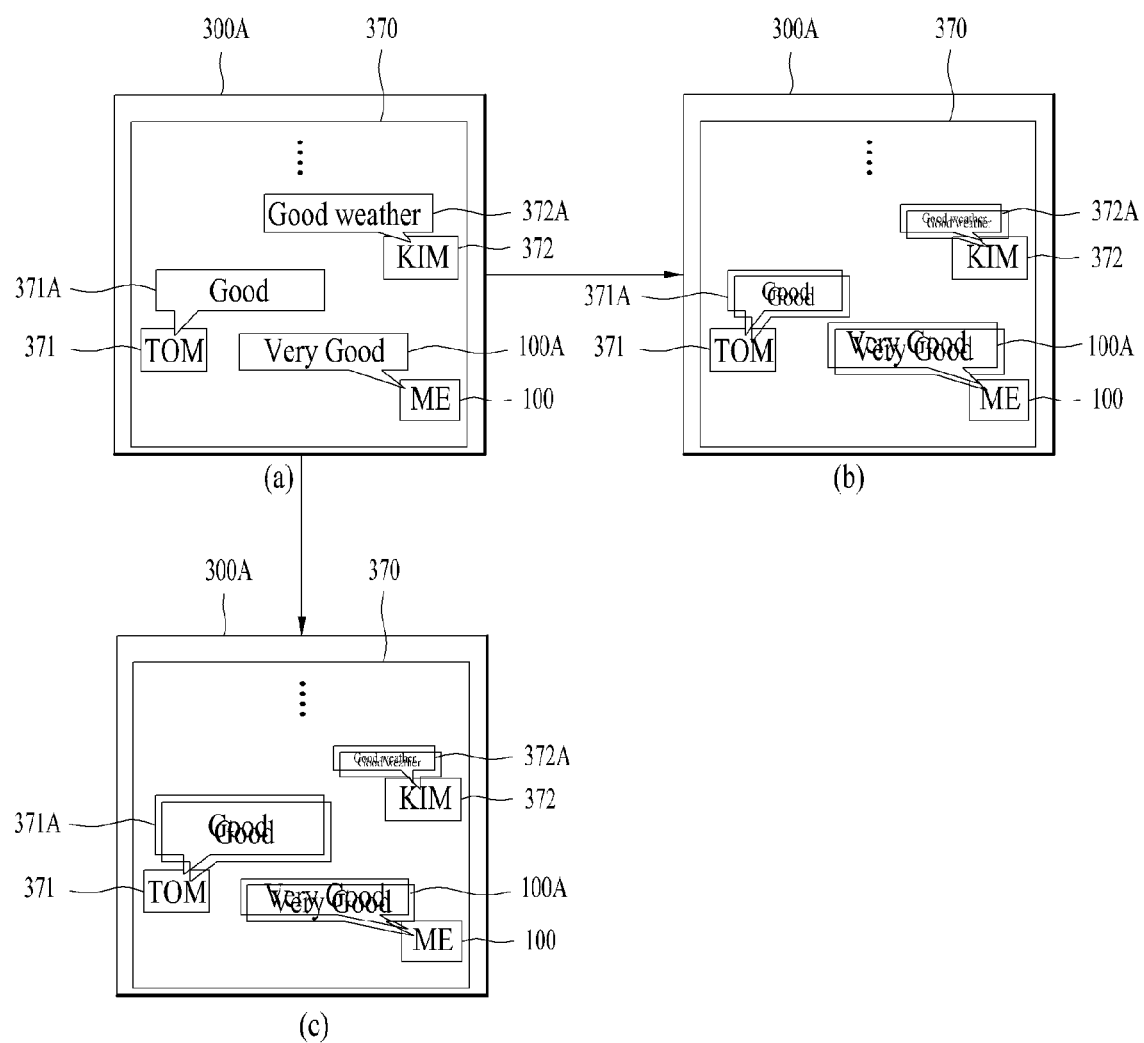
FIG. 24 is a diagram of screen configuration of a process for controlling a 3D operation of a 3D webpage displayed by the processes shown in FIGS. 6 to 10 according to a $14^{th}$ embodiment of the present invention.

Referring to FIG. 24 (*a*), a 3D webpage 300A containing the contents may become a chat messenger 370 for displaying chat contents 100A, 371A and 372A f a chat with a plurality of chat members 100, 371 and 372. Moreover, the chat messenger 370 can become one of the contents in the 3D webpage 300A.

In the following description with reference to FIG. 24, assume that the chat messenger 370 is one of the contents in the 3D webpage 300A. Referring to FIG. 24 (*a*), if the chat messenger 370 is selected and activated in the 3D webpage 360, the controller 180 displays a screen of the chat messenger 370 and then displays chat contents 100A, 371A and 372A transceived with chat members (TOM and KIM) 371 and 372 set by a user (ME) in a manner of sorting the chat contents 100A, 371A and 372A by transmitted/received time.

In doing so, when the chat contents 100A, 371A and 372A are displayed, referring to FIG. 24 (*b*), the controller 180 can give different 3D depths to the chat contents 100A, 371A and 372A in accordance with the transmitted/received time rankings, respectively.

For instance, referring to FIG. 24 (*b*), a 3D depth is given to enable the most recently received chat content 100A to look closest on the screen and a 3D depth is given to enable the most previously received chat content 372A to look farthest from the screen.

When the chat contents 100A, 371A and 372A are displayed, referring to FIG. 24 (*b*), the controller 180 obtains the chat member (TOM) 371 registered as a friend by a user from the chat members (TOM, KIM) 371 and 372 and can give a 3D depth, which is different from a 3D depth of the chat content 372A of the chat member (KIM) 372 not registered as a friend, of the chat content 371A of the obtained chat member (TOM) 371. In particular, the controller 180 gives a more 3D depth to the chat content 371A of the chat member (TOM) 371 registered as the friend in order to enable the chat content 371A to look closer on the screen and also gives a less 3D depth to the chat content 372A of the chat member (MIM) 372 unregistered as the friend in order to enable the chat content 372A to look farther from the screen.

($15^{th}$ Embodiment)

According to a $15^{th}$ embodiment of the present invention, while the 3D webpage displayed by the steps S152 and S154 shown in FIG. 9 is displayed on the mobile terminal 100, if a communication between the mobile terminal 100 and at least one external terminal 600 is established to share screens in-between, the 3D webpage is provided to the external terminal 600.

Figure 26:
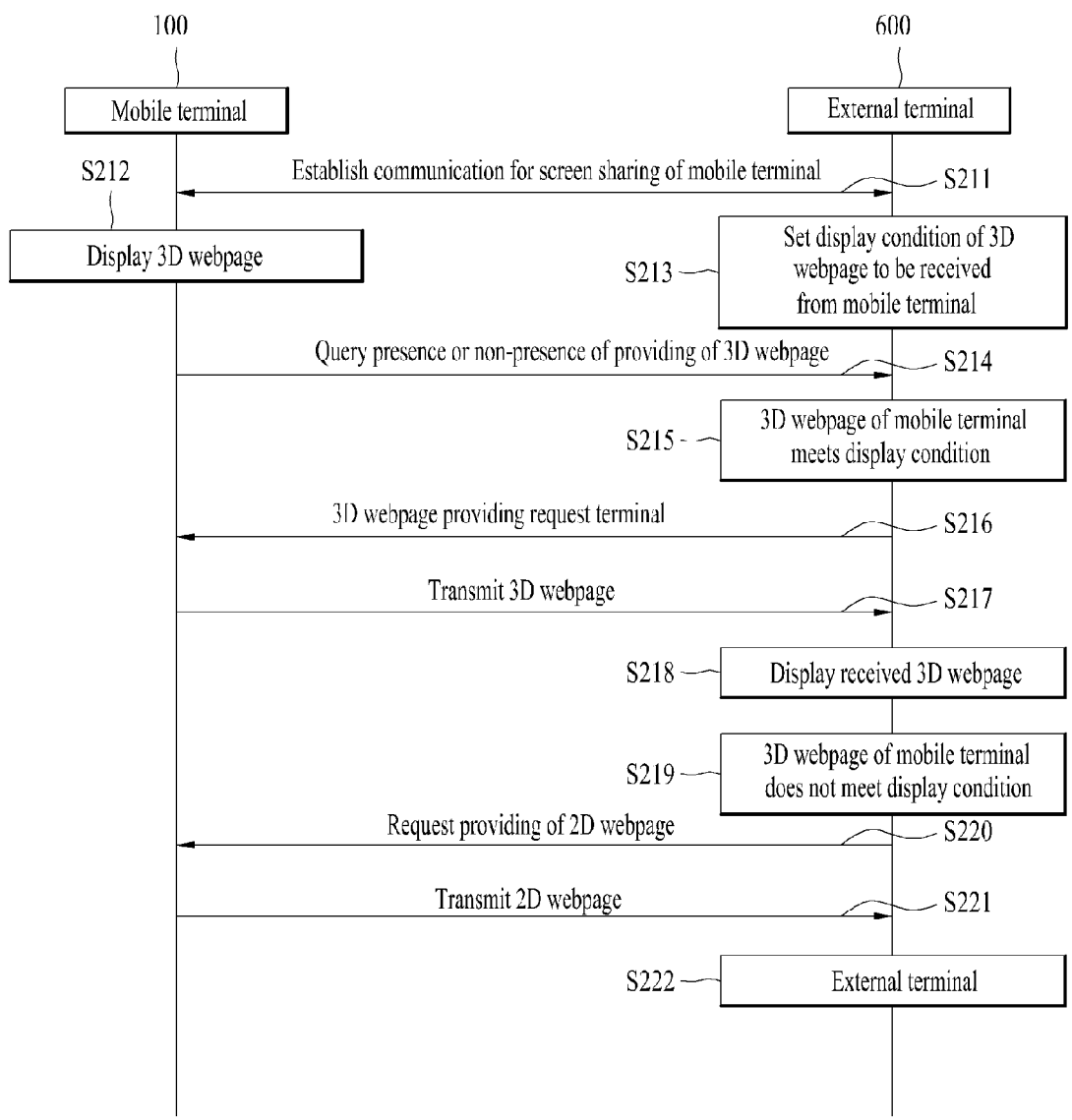
FIG. 26 and FIG. 27 are flowcharts of a process for controlling a 3D operation of a 3D webpage displayed by the processes shown in FIGS. 6 to 10 according to a $5^{th}$ embodiment of the present invention.
Figure 27:
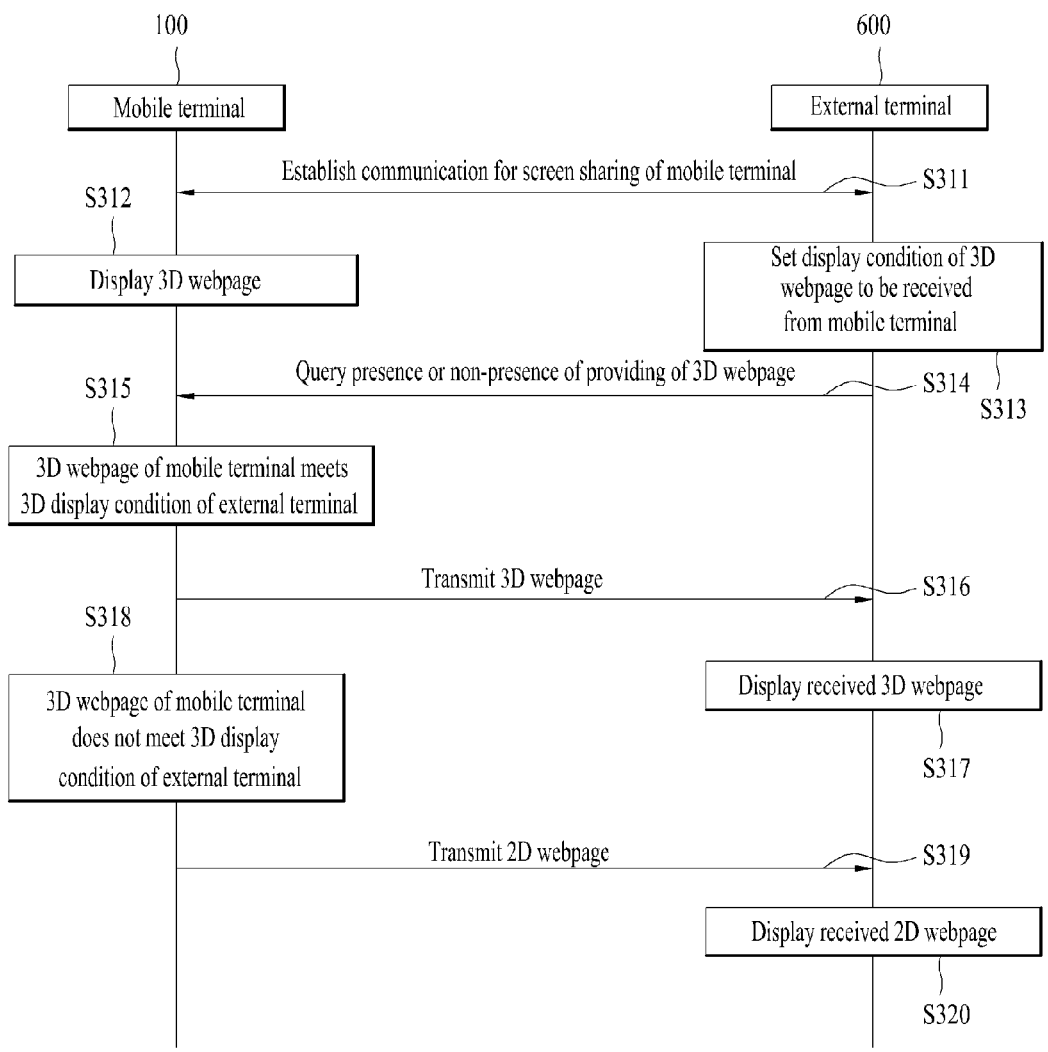

In the following description, the $15^{th}$ embodiment of the present invention is explained in detail with reference to FIGS. 25 to 27. In particular, FIG. 25 is a diagram of screen configuration of a process for controlling a 3D operation of a 3D webpage displayed by the processes shown in FIGS. 6 to 10 according to a $15^{th}$ embodiment of the present invention, and FIGS. 26 and 27 are flowcharts of a process for controlling a 3D operation of a 3D webpage displayed by the processes shown in FIGS. 6 to 10 according to a $5^{th}$ embodiment of the present invention.

Figure 25:
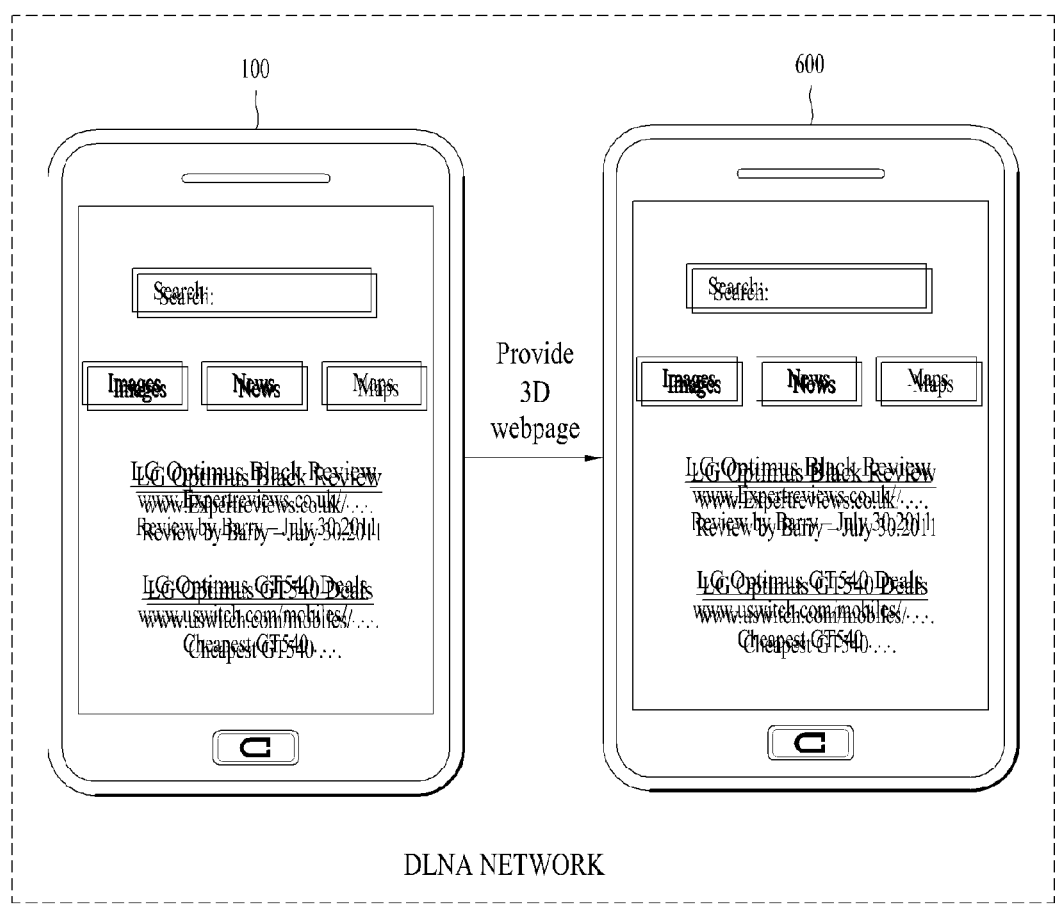
FIG. 25 is a diagram of screen configuration of a process for controlling a 3D operation of a 3D webpage displayed by the processes shown in FIGS. 6 to 10 according to a $15^{th}$ embodiment of the present invention.

Referring to FIG. 25, as a system for sharing a screen of the mobile terminal 100 with at least one external terminal 600 around, a communication between the mobile terminal 100 and the external terminal 600 is established via DLNA (digital living network alliance) or the like. Also, the mobile terminal 100 transmits a screen image displayed on the display unit 151 to the external terminal 600 in order to share the transmitted image with the external terminal 100.

In particular, according to an embodiment of the present invention, the mobile terminal 100 transmits a 3D webpage 300A, which is displayed by being received from the 3D web providing server 700, to the external terminal 600 in order to share the 3D webpage 300A with the external terminal 100.

However, even if the external terminal 600 receives the 3D webpage 300A from the mobile terminal 100, it may not be able to display the received 3D webpage 300A due to option and status of the external terminal 600. In this instance, according to an embodiment of the present invention, the mobile terminal 100 transmits a 2D webpage resulting from conversion of the 3D webpage 300A to the external terminal In doing so, a target, for which whether the external terminal 600 can display the 3D webpage 300A is determined, may become the external terminal 600 or the mobile terminal 100.

FIG. 26 shows a process for the external terminal 600 to determine whether the external terminal 600 can display the 3D webpage 300A received from the mobile terminal 100. And, FIG. 27 shows a process for the mobile terminal 100 to determine whether the external terminal 600 can display the 3D webpage 300A.

Referring to FIG. 26, if a menu function for sharing a screen of the mobile terminal 100 with at least one external terminal 600 connected to DLNA network around the mobile terminal 100 is activated, the controller 180 establishes a communication for screen sharing with the external terminal 600 via the wireless communication unit 110 (S211).

The controller 180 displays the 3D webpage 300A by the above process mentioned in the foregoing description with reference to FIGS. 6 to 25 according to an embodiment of the present invention (S212).

In this instance, components of the external terminal 600 may be identical to those of the mobile terminal 100 shown in FIG. 1 and can perform the same operations of the mobile terminal 100. Thus, the 3D webpage display condition described with reference to FIG. 7 and FIG. 8 may be identically set for the external terminal 600 (S213).

The controller 180 transmits a signal for querying whether the 3D webpage 300A is provided to the external terminal 600 via the wireless communication unit 110 (S213). In doing so, the step S211 and the step S212 may be switched to each other in order. Alternatively, the step S211 and the step S213 may be switched to each other in order.

In accordance with the received query signal, the external terminal 600 checks whether the 3D webpage 300A displayed on the mobile terminal 100 meets the set 3D webpage display condition.

As a result of the check, if the 3D webpage 300A meets the set 3D webpage display condition (S215), the external terminal 600 makes a request for a providing of the 3D webpage 300A to the mobile terminal (S216). The controller 180 can then transmit the 3D webpage 300A to the external terminal 600 by real time via the wireless communication unit 110 (S217). Subsequently, the external terminal 600 can display the 3D webpage 300A received by real time from the mobile terminal 100 (S218).

On the contrary, as a result of the check, if the 3D webpage 300A does not meet the set 3D webpage display condition (S219), since the external terminal 600 is currently unable to display the webpage 300A of the 3D type, the external terminal 600 can make a request for a webpage of a 2D type to the mobile terminal (S220). Subsequently, the controller 180 can transmit the webpage of the 2D type to the external terminal 600 by real time via the wireless communication unit 110 instead of the 3D webpage 300A (S221). Finally, the external terminal 600 can display the 2D webpage received by real time from the mobile terminal 100 (S222).

Meanwhile, referring to FIG. 27, if a menu function for sharing a screen of the mobile terminal 100 with at least one external terminal 600 connected to DLNA network around the mobile terminal 100 is activated, the controller 180 establishes a communication for screen sharing with the external terminal 600 via the wireless communication unit 110 (S311).

The controller 180 displays the 3D webpage 300A by the above process mentioned in the foregoing description with reference to FIGS. 6 to 25 according to an embodiment of the present invention (S312).

The external terminal 600 can identically set the 3D webpage display condition described with reference to FIG. 7 and FIG. 8 (S313) and can transmit the 3D webpage display condition set for the external terminal 600 to the mobile terminal 100 (S314).

The controller 180 checks whether the displayed 3D webpage 300A meets the received 3D webpage display condition of the external terminal 600.

As a result of the check, if the displayed 3D webpage 300A meets the 3D webpage display condition (S315), the controller 180 can transmit the 3D webpage 300A to the external terminal 600 by real time via the wireless communication unit 110 (S316). Subsequently, the external terminal 600 can display the 3D webpage 300A received by real time from the mobile terminal 100 (S317).

On the contrary, as a result of the check, if the displayed 3D webpage 300A does not meet the 3D webpage display condition (S318), since the external terminal 600 is currently unable to display the 3D webpage 300A, the controller 180 can transmit a webpage of a 2D type to the external terminal 600 by real time via the wireless communication unit 110 instead of the 3D webpage 300A (S319). Finally, the external terminal 600 can display the 2D webpage received by real time from the mobile terminal 100 (S320).

(16$^{th}$ Embodiment)

According to a 16$^{th}$ embodiment of the present invention, while the 3D webpage displayed by the steps S152 and S154 shown in FIG. 9 is displayed on the mobile terminal 100, if the mobile terminal 100 is paired with at least one external terminal 600 through short-range communication, the mobile terminal 100 provides the 3D webpage to the external terminal 600.

In the following description, the 16$^{th}$ embodiment of the present invention is explained in detail with reference to FIG. 28. In particular, FIG. 28 is a diagram of screen configuration of a process for controlling a 3D operation of a 3D webpage displayed by the processes shown in FIGS. 6 to 10 according to a 16$^{th}$ embodiment of the present invention.

Figure 28:
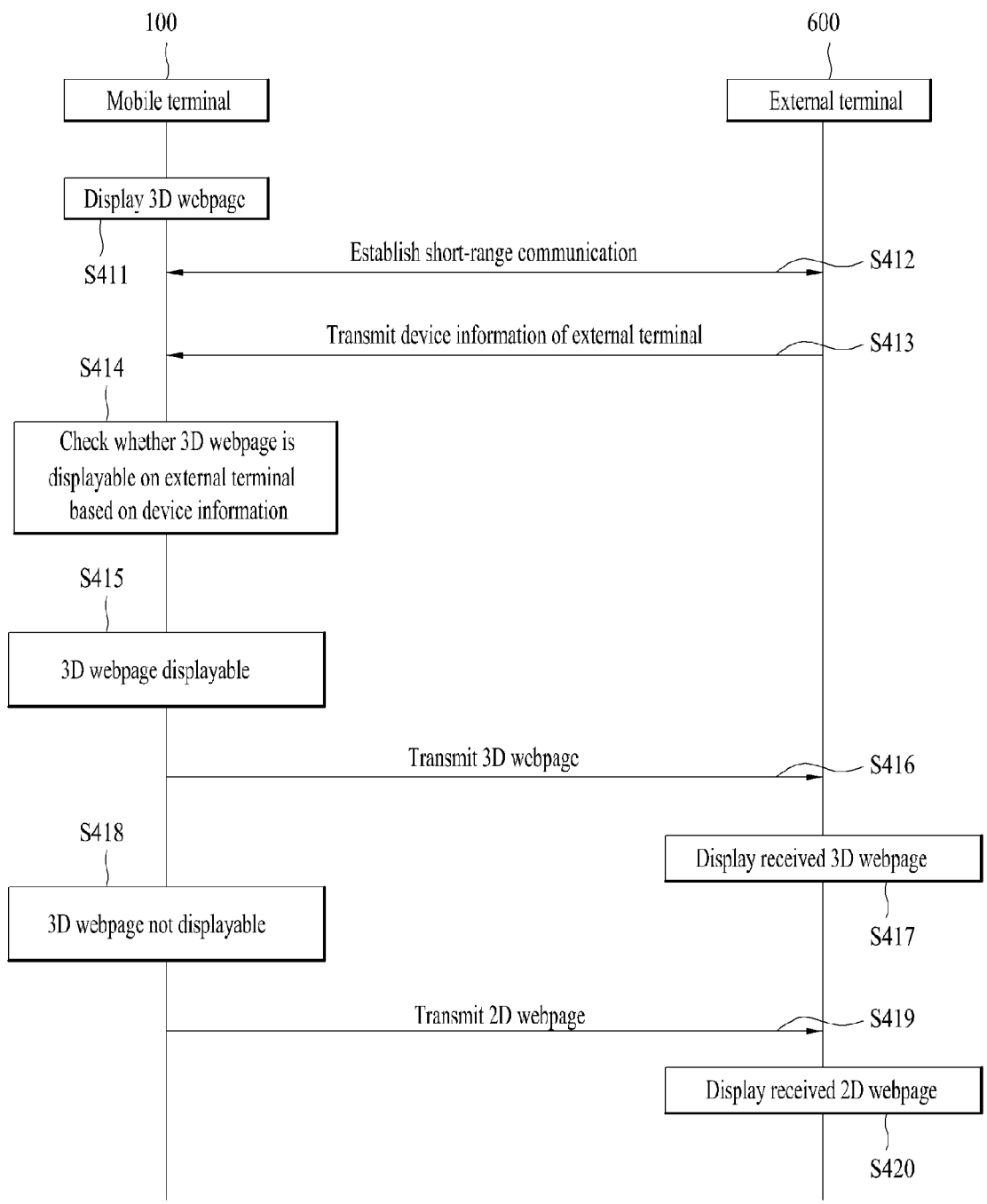
FIG. 28 is a diagram of screen configuration of a process for controlling a 3D operation of a 3D webpage displayed by the processes shown in FIGS. 6 to 10 according to a $16^{th}$ embodiment of the present invention.

Referring to FIG. 28, while a 3D webpage 300A is displayed (S411), if a short-range communication is established between the mobile terminal 600 and an external terminal 600 around the mobile terminal 100 via the short-range communication module 114 (S412), the controller 180 can receive device information of the external terminal 600 from the external terminal 600 (S413). In this instance, the device information may include options of parts, modules, devices and the like mounted on the external terminal 600.

In doing so, the step S411 and the step S412 may be switched to each other in order. Alternatively, the steps S412 and S413 may be switched to the step S411 in order.

Based on the received device information of the external terminal 600, the controller 180 checks whether the external terminal 600 can display the 3D webpage 300A (S414). Preferably, based on the device information, the controller 180 can check whether an option of the external terminal 600 is available for 3D support.

As a result of the check, if the external terminal 600 can display the 3D webpage 300A (S415), the controller 180 can transmit the 3D webpage 300A to the external terminal 600 by real time via the short-range communication module 114 (S416). Subsequently, the external terminal 600 can display the 3D webpage 300A received by real time from the mobile terminal 100 (S417).

On the contrary, as a result of the check, if the external terminal 600 is unable to display the 3D webpage 300A (S416) since the external terminal 600 is currently unable to display the 3D webpage 300A, the controller 180 can transmit a webpage of a 2D type to the external terminal 600 by real time via the short-range communication module 114 instead of the 3D webpage 300A (S419). Finally, the external terminal 600 can display the 2D webpage received by real time from the mobile terminal 100 (S420).

Accordingly, the present invention provides the following effect and/or advantage. First of all, the present invention appropriately provides 3D or 2D webpage in consideration of a display condition of the 3D webpage set for a mobile terminal in case of a presence of a 3D webpage display request made by a user, thereby providing a 3D or 2D webpage service optimized for a status of the mobile terminal.

It will be apparent to those skilled in the art that various modifications and variations can be specified into other form (s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to request a 3D webpage from a web server providing the 3D webpage including a plurality of 3D content, and to receive the 3D webpage from the web server;
a display unit configured to display the 3D webpage received via the wireless communication unit;
a memory configured to set a display condition of the 3D webpage for the mobile terminal; and
a controller configured to:
detect whether a current status of the mobile terminal meets the set display condition when a command for accessing the 3D webpage is input before the 3D webpage is requested from the web server,
request and receive the 3D webpage via the wireless communication unit if the current status of the mobile terminal meets the set display condition,
control the display unit to display the received 3D webpage, and
control a 3D operation of the displayed 3D webpage.

2. The mobile terminal of claim 1, wherein the display condition indicates a display scheme of a webpage is set to 3D by a user, and
wherein when the command is input, if the display scheme of the webpage is set to the 3D, the controller is further configured to control the 3D webpage to be requested, received and displayed.

3. The mobile terminal of claim 1, wherein the display condition includes an option of the mobile terminal supports a 3D function, and
wherein if the option of the mobile terminal supports the 3D function, the controller is further configured to control the 3D webpage to be requested, received and displayed.

4. The mobile terminal of claim 1, wherein the display condition includes a power level available for a display of the 3D webpage, and
wherein if a remaining power level of the mobile terminal is equal to or higher than the power level, the controller is further configured to control the 3D webpage to be requested, received and displayed.

5. The mobile terminal of claim 1, wherein the display condition includes a download speed of the 3D webpage of the wireless communication unit, and
wherein if a current download speed of the 3D webpage is equal to or higher than the download speed, the controller is further configured to control the 3D webpage to be requested, received and displayed.

6. The mobile terminal of claim 1, wherein the display condition includes a temporary storage capacity for the 3D webpage, and
wherein if a current temporary storage capacity of the mobile terminal is equal to or greater than the temporary storage capacity, the controller is further configured to control the 3D webpage to be requested, received and displayed.

7. The mobile terminal of claim 1, wherein the display condition includes that 3D is recommended as the display scheme of the webpage by the web server, and
wherein if a signal indicating that the 3D is recommended as the display scheme of the webpage is received from the web server via the wireless communication unit, the controller is further configured to control the 3D webpage to be requested, received and displayed.

8. The mobile terminal of claim 1, wherein the display condition includes a landscape display mode condition for the display unit, and
wherein if the display unit is in the landscape display mode, the controller is further configured to control the 3D webpage to be requested, received and displayed.

9. The mobile terminal of claim 1, wherein if the current status of the mobile terminal does not meet the display condition, the controller is further configured to request a 2D webpage corresponding to the 3D webpage.

10. The mobile terminal of claim 1, wherein if the current status of the mobile terminal does not meet the display condition, the controller is further configured to control the requested 3D webpage to be received from the web server, and display a 2D image of either a left or right eye image of the received 3D webpage.

11. The mobile terminal of claim 1, wherein the controller is further configured to check a presence or non-presence of 3D support availability for the contents in the displayed 3D webpage, and
wherein the controller is further configured to display indicating information indicating the presence or non-presence of the 3D support availability on each of the contents.

12. The mobile terminal of claim 1, wherein the controller is further configured to initially display at least one 3D supportable text content in the displayed 3D webpage in 2D, and
wherein if the 2D text content is selected, the controller is further configured to display the 2D text content as a 3D text content.

13. The mobile terminal of claim 12, wherein if a proportion of text content among the contents in the displayed 3D webpage is equal to or greater than a preset value, the controller is further configured to display the text contents in 2D.

14. The mobile terminal of claim 1, wherein the controller is further configured to display the contents in the 3D webpage by categorizing the contents by category, and
wherein the controller is further configured to give different 3D depths to the corresponding contents categorized by the category, respectively.

15. The mobile terminal of claim 14, wherein the controller is further configured to recognize use frequencies of the contents by counting the contents per the category to which each of the contents belongs, and
wherein the controller is further configured to give the different 3D depths to the corresponding contents in accordance with rankings of the obtained use frequencies per the category, respectively.

16. The mobile terminal of claim 1, wherein if a specific part in the 3D webpage is specified, the controller is further configured to convert the specified part to a 2D part or a 3D part.

17. The mobile terminal of claim 1, wherein if a popup window including specific information is generated from the 3D webpage, the controller is further configured to give the generated popup window a 3D depth different from that of the 3D webpage.

18. The mobile terminal of claim 1, wherein the controller is further configured to recognize recent upload rankings of the contents in the 3D webpage, and wherein the controller is further configured to give different 3D depths to the contents in accordance with the recognized upload rankings, respectively.

19. The mobile terminal of claim 1, wherein if the content indicating a list of search rankings of a plurality of search words is selected from the contents included in the 3D webpage, the controller is further configured to give different 3D depths to the search words in accordance with the search rankings, respectively.

20. The mobile terminal of claim 1, wherein the controller is further configured to recognize use frequency rankings of the contents or menu functions included in the 3D webpage, and
wherein the controller is further configured to give different 3D depths to the contents or the menu functions in accordance with the recognized use frequency rankings, respectively.

21. The mobile terminal of claim 1, wherein the controller is further configured to give different 3D depths to at least one content already selected from the contents in the 3D webpage and at least one content unselected from the contents in the 3D webpage, respectively.

22. The mobile terminal of claim 1, wherein if an input window included in the 3D webpage is selected, the controller is further configured to give the selected input window a 3D depth different from that of the 3D webpage.

23. The mobile terminal of claim 1, wherein the 3D webpage including the contents includes an email storage box including a plurality of received emails, and
wherein the controller is further configured to give different 3D depths to at least one checked email of the emails and at least one unchecked email of the emails, respectively.

24. The mobile terminal of claim 1, wherein the 3D webpage including the contents includes a messenger including a plurality of chat contents, and
wherein the controller is further configured to obtain recently-received time rankings of the chat contents and gives different 3d depths to the chat contents in accordance with the obtained recently-received time rankings, respectively.

25. The mobile terminal of claim 24, wherein the controller is further configured to obtain the chat content of a previously-registered friend from the chat contents, and
wherein the controller is further configured to give the obtained chat content a 3D depth different from those of the rest of the contents.

26. The mobile terminal of claim 1, wherein the wireless communication unit establishes a communication with at least one external terminal preset to share a screen of the display unit in-between,
wherein the controller is further configured to transmit a signal for querying a presence or non-presence of a providing of the 3D webpage to the at least one external terminal via the wireless communication unit, and
wherein if a signal for requesting the providing of the 3D webpage is received from the at least one external terminal, the controller is further configured to transmit the 3D webpage to the at least one external terminal.

27. The mobile terminal of claim 26, wherein if the display condition for the 3D webpage is previously set and the 3D webpage meets the previously set display condition, the at least one external terminal transmits the signal for requesting the providing of the 3D webpage to the mobile terminal.

28. The mobile terminal of claim 1, wherein the wireless communication unit establishes a communication with at least one external terminal preset to share a screen of the display unit in-between,
wherein if the communication with the at least one external terminal is established via the wireless communication unit, the controller is further configured to receive the display condition of the 3D webpage for the at least one external terminal from the at least one external terminal, and
wherein if the 3D webpage meets the received display condition, the controller is further configured to transmit the 3D webpage to the at least one external terminal.

29. The mobile terminal of claim 1, wherein if a short-range communication with an external terminal is established, the wireless communication unit receives a device information of the external terminal from the external terminal, and
wherein if an option of the external terminal supports a 3D function based on the received device information of the external terminal, the controller is further configured to transmit the 3D webpage to the external terminal.

30. A method of controlling a mobile terminal, the method comprising:
setting a display condition of a 3D webpage including a plurality of 3D contents;
checking whether a current status of the mobile terminal meets the set display condition if a command for an access to the 3D webpage is input;
requesting and receiving the 3D webpage from a web server providing the 3D webpage if the display condition is met;
displaying the received 3D webpage; and
controlling a 3D operation of the displayed 3D webpage.

* * * * *